(12) United States Patent
Bickerstaff et al.

(10) Patent No.: US 8,184,046 B2
(45) Date of Patent: May 22, 2012

(54) TIME REFERENCE SYSTEM

(75) Inventors: Jacqueline Peta Bickerstaff, Northamptonshire (GB); Esther Olulu Anyaegbu, Northamptonshire (GB); Peter Mark Fleming, Berkshire (GB); Gerald Whitworth, Northamptonshire (GB)

(73) Assignee: ST-Ericsson SA, Geneva (CH)

( * ) Notice: Subject to any disclaimer, the term of this patent is extended or adjusted under 35 U.S.C. 154(b) by 146 days.

(21) Appl. No.: 12/562,099

(22) Filed: Sep. 17, 2009

(65) Prior Publication Data

US 2010/0188286 A1    Jul. 29, 2010

Related U.S. Application Data

(60) Provisional application No. 61/109,438, filed on Oct. 29, 2008.

(30) Foreign Application Priority Data

Sep. 17, 2008  (GB) .................................. 0817061.5
Sep. 29, 2008  (GB) .................................. 0817812.1

(51) Int. Cl.
   *G01S 19/25* (2010.01)
(52) U.S. Cl. .................................................. 342/357.64
(58) Field of Classification Search ............ 342/357.42, 342/357.43, 357.52, 357.62, 357.64, 357.75–357.78
   See application file for complete search history.

(56) References Cited

U.S. PATENT DOCUMENTS

| | | | |
|---|---|---|---|
| 6,346,911 B1 * | 2/2002 | King ........................ | 342/357.62 |
| 6,433,734 B1 * | 8/2002 | Krasner ................... | 342/357.64 |
| 6,684,158 B1 | 1/2004 | Garin et al. | |
| 7,260,160 B1 | 8/2007 | Lennen | |
| 2002/0183070 A1 | 12/2002 | Bloebaum et al. | |
| 2003/0151547 A1 | 8/2003 | Mauro et al. | |
| 2003/0227963 A1 | 12/2003 | Dafesh | |
| 2005/0124390 A1 | 6/2005 | Hansson et al. | |
| 2006/0012515 A1 | 1/2006 | Park et al. | |

(Continued)

FOREIGN PATENT DOCUMENTS

EP    1564564    7/2007

OTHER PUBLICATIONS

Dana, P.H., "Global Positioning System (GPS) Time Dissemination for Real-Time Applications" Real Time Systems 1997, 12(1):9-40, XP000695933.

(Continued)

*Primary Examiner* — Harry Liu
(74) *Attorney, Agent, or Firm* — Coats & Bennett, P.L.L.C.

(57) ABSTRACT

A time reference system for generating a time reference from signals produced by a global navigation satellite constellation has a satellite signal receiver to receive and down-convert code-modulated signals from a plurality of satellites and a correlator to track and decode the down-converted signals to provide signals containing partial pseudo-range measurements for respective satellites. A data processing arrangement receives assistance data from an external source and performs data-bit synchronization in which bit edges of a low frequency data bit stream carried by the received satellite signals are identified, to perform a preliminary position-velocity-time solution to provide an approximate time reference, and to perform auto-correlation of pre-selected data sequences in the data stream to resolve time ambiguities thereby to compute a precise time reference signal in weak received signal conditions. The pre-selected data sequences may be the repeated data preamble in the GPS navigation message constituted by the data stream.

15 Claims, 19 Drawing Sheets

U.S. PATENT DOCUMENTS

2006/0238418 A1    10/2006  Monnerat et al.
2007/0183486 A1*    8/2007  Cheng et al. .................. 375/150
2008/0088505 A1     4/2008  Bryant et al.
2009/0289849 A1*   11/2009  Mantovani ............... 342/357.15

OTHER PUBLICATIONS

Ziedan, et al., "Bit Synchronization and Doppler Frequency Removal at Very Low Carrier to Noise Ratio Using a Combination of the Viterbi Algorithm with an Extended Kalman Filter" ION GPS/GNSS Sep. 9-12, 2003, pp. 616-627, XP02569859.

Anyagbu, et al., "Precise Timing using a High Sensitivity Receiver in Indoor Environments" ION GNSS 21$^{st}$, International Technical Meeting of the Satellite Division, Sep. 16-19, 2008, Savannah, GA, pp. 590-601, XP002569742.

Search Report under Section 17, Application No. GB0817061.5, dated Jan. 9, 2009.

Search Report under Section 17, Application No. GB0817061.5, dated Sep. 15, 2009.

International Search Report and Written Opinion of the International Searching Authority, Application No. PCT/GB2009/002231, Mar. 25, 2010.

* cited by examiner

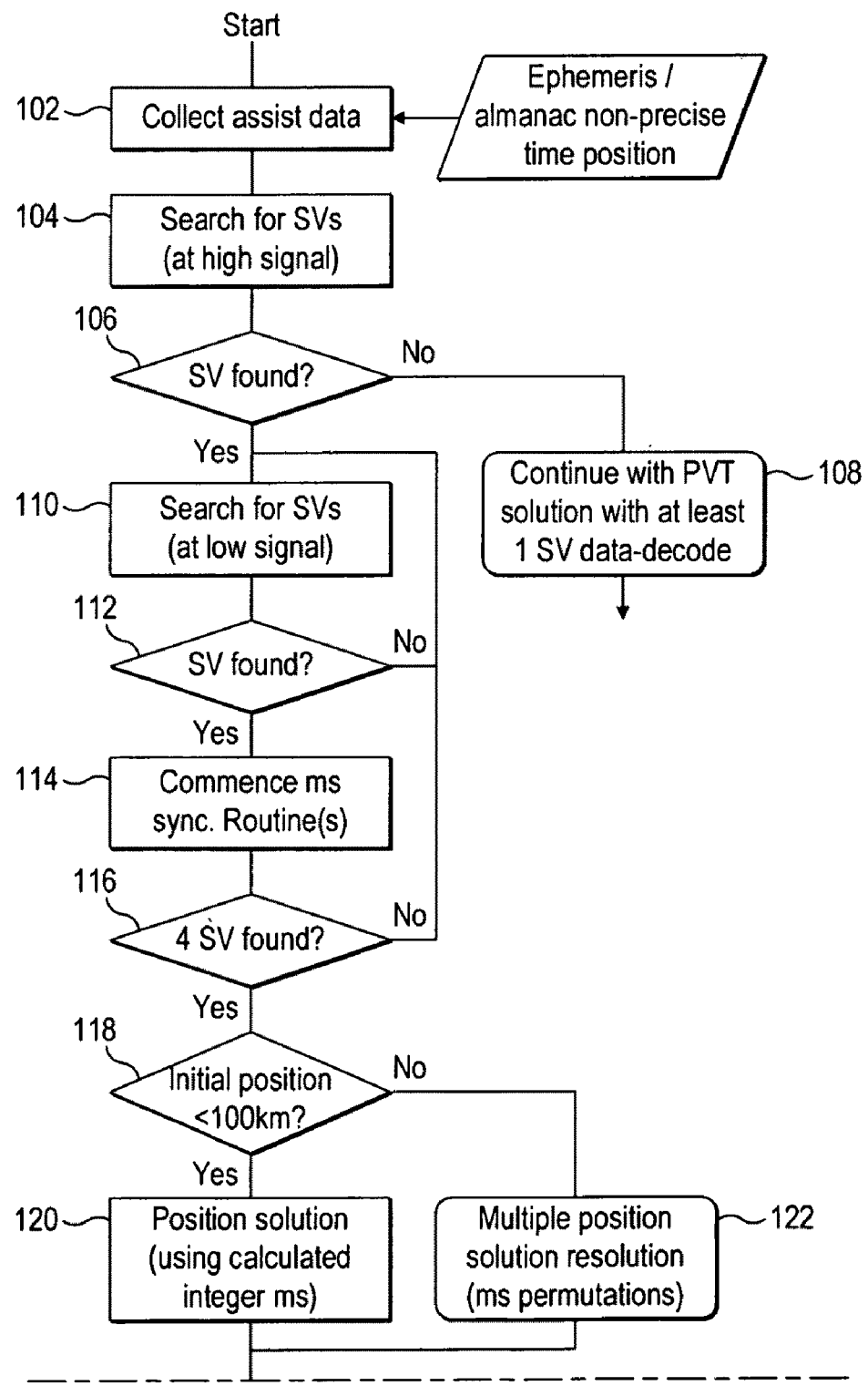

PPS offset during low signal acquisition using a simulator TTFF = 3.73 mins

No of sats during low signal acquisition using a simulator TTFF = 3.73 mins

PPS offset during low signal acquisition using an attenuated roof antenna
TTFF = 6.867 mins No of sats during low signal acquisition using an attenuated roof antenna
TTFF = 6.867 mins

TIME REFERENCE SYSTEM

CROSS-REFERENCE TO RELATED APPLICATION

The present application claims priority under 35 U.S.C. §119(a)-(d) to UK Patent Application No. 0817061.5 filed on Sep. 17, 2008 and UK Patent Application No. 0817812.1 filed on Sep. 29, 2008, the entire contents of each of which are incorporated by reference herein. The present application claims priority under 35 U.S.C. §119(e) to U.S. Provisional Patent Application No. 61/109,438 filed on Oct. 29, 2008, the entire contents of which are incorporated by reference herein.

TECHNICAL FIELD

This invention relates to a time reference system for generating a time reference from signals produced by a global navigation satellite constellation. A primary application of the invention is in obtaining a precise time reference in weak signal environments.

BACKGROUND

The global positioning system (GPS) is widely used for timing. GPS timing receivers are commonly used to provide a timing reference for telecommunications systems, for instance, in cell phone base stations. In such situations, a time reference accurate to within a few nanoseconds may be required. Typically, known receivers of such accuracy require a clear view of the sky. For an indoor installation, as is commonly the case for telecommunications equipment, this requirement entails use of an external antenna, cabling, and an associated interface. The cost and installation time of such an arrangement is high, inhibiting the installation of, for instance, picocells base stations indoors.

Conventionally, a GPS system obtains a time reference from a low frequency satellite data signal, which contains a Time of Week (TOW) data sequence. This signal has coarse resolution sufficient to identify the frame structure of the transmitted data. Finer resolution for the time is obtained by recognizing sub-frame edges within the data, which allows reduction of the time uncertainty from about 6 seconds to 20 milliseconds. It is known, in addition, to detect data-bit edges, reducing the 20 ms uncertainty to 1 ms, and to align an internal code reference with the transmitted spreading code and to measure the spreading code phase to reduce the uncertainty to less than 1 µs. In practice, such measurements are like pseudo-range measurements in that they contain uncorrected errors until a positioning engine (e.g. a Kalman filter) has produced convergence of position-time-velocity (PVT) solutions to take account of the signal delay times occurring in the communication of the signals from a plurality of satellites in the GPS constellation to the receiver.

In weak signal conditions, such as may occur in confined spaces, e.g. between buildings or inside buildings, the above method cannot be used, because the satellite signals are too small to decode the data stream. The inability to decode data, which contains necessary satellite ephemeris and clock corrections, may be overcome by feeding the same information to the receiver over a communications link. Typically, however, an accurate time reference cannot be sent in this way and, usually, the best that can be achieved is a coarse time reference accurate to the order of 1 second. This is sufficient for the receiver to establish a starting estimate of the position of satellites in the sky, but insufficient for an accurate position solution. Consequently, a GPS receiver for use in weak signal conditions must perform other processes for obtaining a more accurate time reference.

Computation of a PVT solution involves solving sets of equations containing data from successive time-of-arrival measurements from different satellites. Such computation is effectively performed by a Kalman filter and, given sufficient time, an accurate position solution can be derived. The Kalman filter resolves ambiguities occurring in respect of each satellite in view into a single, consistent set to match the initial position, Doppler shifts, and SV (space vehicle) movements over time. However, absolute time remains unresolved, the absolute time uncertainty being in the order of +/−30 ms or greater. The inaccuracy depends on many effects, including not only signal level, but also multi-path effects, and other kinds of interference.

It is an object of the invention to provide a reference time solution for a weak signal situation which avoids the need for an antenna with a clear view of the sky.

SUMMARY OF THE INVENTION

According to a first aspect of this invention, a time reference system for generating a time reference from signals produced by a global navigation satellite constellation comprises: a satellite signal receiver having a radio frequency stage for receiving and down-converting code-modulated signals from a plurality of satellites and a correlator to receive, track and decode the down-converted satellite signals to provide signals containing partial pseudo-range measurements for respective satellites; and a data processing arrangement configured to receive signals containing assistance data from a source other than the received and down-converted satellite signals and the signals containing partial pseudo-range measurements, to perform data-bit synchronisation in which the bit edges of a low frequency data bit stream carried by the received satellite signals are identified, to perform correlation of pre-selected data sequences in the low frequency data stream to resolve time ambiguities, and to compute a time reference signal based on the assistance data, the partial pseudo-range measurements and code-tracking outputs from the satellite signal receiver, the data-bit synchronisation and the data sequence correlation.

Typically, the assistance data contains satellite ephemeris and/or almanac information which may be fed into the data processing arrangement from, for instance, a telecommunications network, the assistance data having been generated elsewhere using a remote satellite signal receiver in a strong signal environment.

The system preferably includes a frequency-locked loop contained at least partly in the satellite signal receiver and operable to generate a Doppler shift signal indicative of Doppler shifts caused by satellite motion, where in the data processing arrangement of the system is configured to modify the data-bit synchronisation in response to the Doppler shift signal. Thus, to compensate for any frequency offsets, a feedback loop is employed, preferably in the data processing arrangement, to improve the accuracy of data-bit synchronization.

The data processing arrangement is also preferably configured to provide a preliminary time solution, typically with a time uncertainty equal to the duration of between 1 and 5 data-bits of a low frequency data stream, using a position-velocity-time estimate produced from the partial pseudo-range measurements and, preferably, Doppler measurements. Ambiguity resolution algorithms may be used to provide a best-fit for the measurements and the assistance data. Intermediate ambiguity resolution and time solution adjustment may be performed using the results of the data-bit synchronisation and the correlation of pre-selected data sequences from the signals received from a selected one of the satellites from which the receiver receives signals. Further adjustment of the time solution is preferably performed in response to the code tracking output to produce the time reference signal.

The pre-selected data sequences may embody a repeated data pattern. In the case of GPS, the data-bit preamble sequence in the low-frequency data stream is one such pattern. In such a case, the processor arrangement is configured such that a correlation of the data sequence comprises correlation of a signal with the expected data pattern over successive instances of the repeated data pattern in the data stream in the signal received from at least one of the satellites from which signals are received by the receiver. Alternatively, the data sequences are selected on the fly. In other words, the selection may be a dynamic process occurring in real time. Such selection may make use of the assistance data or may be performed by a prediction process based on previously received data sequences, or based on the assistance data. The processing arrangement may be configured in such cases to perform auto-correlation of the data patterns of potential data sequences, selection being based on the quality of the auto-correlation maximum compared to average or secondary values. In either case, the correlation of incoming data in the data stream may be performed by a combination of coherent integration and incoherent integration.

Typically, when a frequency-locked loop is used to refine the data-bit synchronisation, a preliminary PVT solution is provided having a time accuracy no better than +/−11 ms (typically no better than +/−15 ms), the solution being in the form of a plurality of pseudo-range time solution options, one of which is accurate to within better than +/−3 ms. Correlation to identify the most accurate time solution option may comprise correlation of the pre-selected data sequences using coherent integration over intervals no longer than the reciprocal of the frequency stability of the frequency-locked loop. The selection of the most accurate time solution option may include incoherent integration of the results of the above coherent integration over a longer interval. In conditions in which frequency stability of the frequency-locked loop is poor, a repeated data sequence shorter than the GPS preamble may be used. Alternatively, a differentially demodulated correlation may be used, whereby the pattern to be matched is not the navigation data, but the differential-demodulation of successive bits of the data stream, in which case longer data bit sequences (than the reciprocal of the frequency stability) may be used.

If non-repetitive data sequences are used, pre-selection includes a determination of the suitability of sequences for correlation (i.e. avoiding sequences in which, within the respective sequence, the data value does not change or sequences involving, e.g., simple alternation of the data value between high and low values within the respective sequence).

A data sequence or sequences of 16 bits or less are used for pattern matching, with 8-bit or shorter sequences being used.

According to a second aspect of the invention, there is provided a method of generating a time reference signal from signals produced by a global navigation satellite constellation, comprising receiving, down-converting, and tracking the signals transmitted by a plurality of satellites in the constellation to produce a plurality of receiver output signals, receiving assistance data from a source other than the directly received satellite signals, and producing from the receiver output signals and the assistance data signals representing a preliminary time solution, correlating pre-selected data sequences in a data stream carried by the signals transmitted by at least one of the satellites to resolve time ambiguities in the preliminary time solution, thereby to generate a time reference signal representing time to an accuracy of better than +/−1 ms.

According to a third aspect of the invention, a method of generating a time reference signal from signals produced by global navigation satellite constellation comprises: receiving, down-converting, and tracking the signals transmitted by a plurality of satellites in the constellation to produce a plurality of receiver output signals, receiving assistance data from a source other than the directly received satellite signals, and producing from the receiver output signals and the assistance data signals representing a preliminary time solution, performing data-bit synchronisation in which the bit edges of a data stream carried by the signals transmitted by at least one of the satellites are identified, the data-bit synchronisation including performing frequency-shift-compensated integration of samples of the received data stream, so as to compensate for the shift, e.g. Doppler shift, of the data rate of the received data stream.

BRIEF DESCRIPTION OF THE DRAWINGS

The invention will now be described by way of example with reference to the drawings in which.

DETAILED DESCRIPTION

Figure 1:
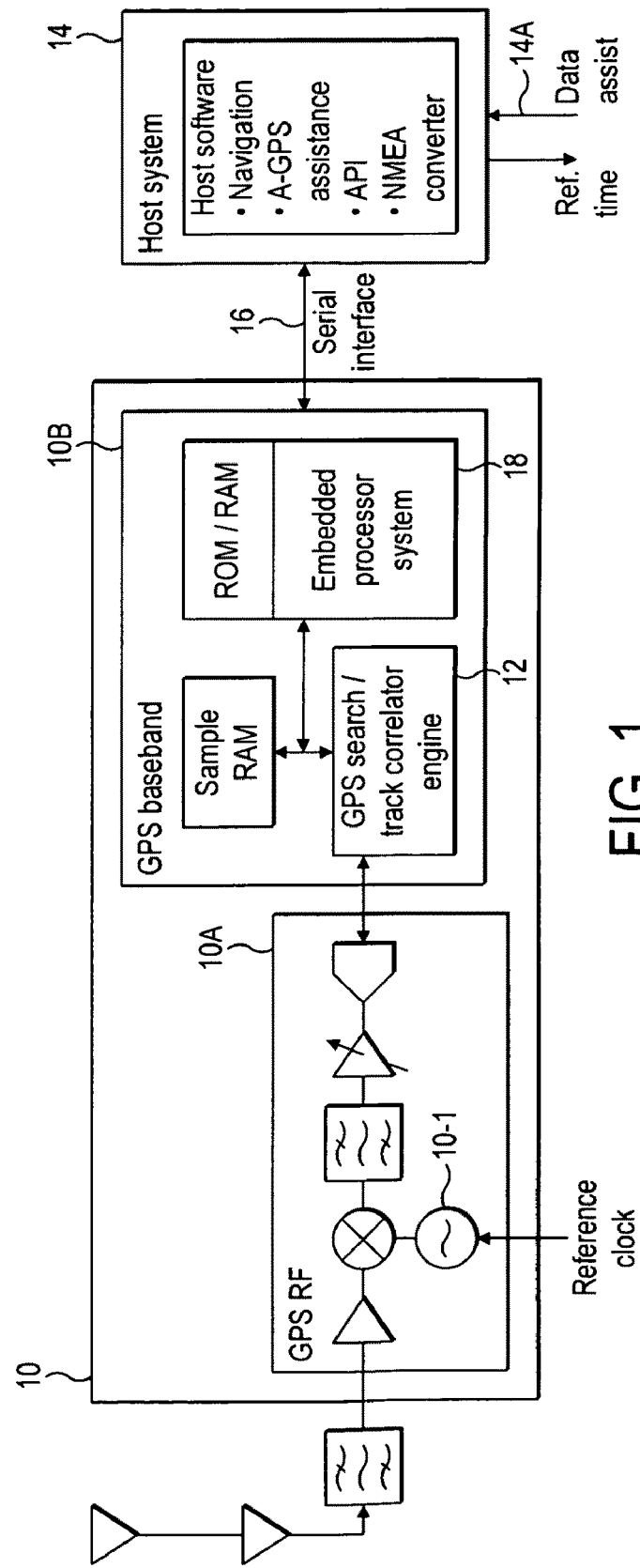
FIG. 1 is a block diagram of a time reference system in accordance with the invention.

Indoor environments are notoriously challenging arenas for GPS to operate within as the line of sight signals between satellites and user are often obscured or heavily attenuated, and an indoor receiver is highly susceptible to the increased interference from sources usually present indoors, leading to poor availability for precise time transfer and accurate synchronisation applications. In addition there is also often a large number of multipath signals which reduces the achievable timing accuracy.

GPS timing performance is usually limited by the ability of the receiver to demodulate the navigation data and, in reducing timing uncertainty to the millisecond level, to identify and resolve the correct millisecond at signals below about −145 dBm. This is because at this processing point the signal level is too low to locate the phase inversions between data bits and to resolve the data bits, so that the receiver may have to integrate asynchronously with the data bit edges. Assistance data can however be provided via an A-GPS link to the receiver. Once a fix is established, the offset between GPS time and local time can be converged by the navigation solution, but the resolution does not allow exact millisecond synchronisation at low signal levels. The navigation solution can establish the time, given more than four satellites, to approximately ±50 ms. This figure is dependent on the signal conditions and is illustrated hereinafter with results from some field trials.

If the navigation solution can converge time to approximately ±10 ms, the bit synchronisation algorithm could find the bit transition and thus resolve the millisecond ambiguity. However, with a time uncertainty of 30 to 50 ms, the bit synchronisation algorithm can resolve the millisecond ambiguity, but this still leaves a 20 ms ambiguity.

In accordance with the invention, the navigation solution is used to refine the time solution to approximately 30 to 50 ms, establish 1 ms bit synchronisation, resolve the 20 ms ambiguity, and thus obtain precise time. To remove time uncertainty, in one preferred embodiment of the invention a proposed algorithm resolves the 20 ms ambiguity by exploiting the repetitive structure of the GPS data preamble. As described below, the GPS preamble has good autocorrelation properties over the required time uncertainty. Alternative algorithms to exploit this autocorrelation and resolve the 20 ms ambiguity are disclosed and compared.

In the past years, a number of different techniques have been introduced in order to improve the performance of indoor GPS applications, such as assisted GPS, where the reference network provides assistance in terms of the navigation message, initial position and time estimates. This allows the GPS receiver to increase the coherent integration period within the receiver with the consequent sensitivity gains. However, the coherent integration time is limited to 20 ms due to the navigation data bits as well as the residual frequency errors during the coherent integration period. The residual frequency errors are caused by satellite motion, receiver clock instability and user motion induced Doppler effects. Conventional GPS receivers typically use integration periods less than the maximum 20 ms coherent period and are therefore limited in terms of their operational environments to where there are strong signals (signals above −145 dBm).

An example time reference system in accordance with the invention uses a GNS4540 integrated circuit chip available from ST-Ericsson.

The GNS4540 is a high-performance single chip L1 GPS receiver chip, which provides baseband signal processing. A Digital Signal Processor (DSP) contains the firmware that controls the GPS acquisition and tracking while the navigation solution runs on a host processor, which may be a processor on an embedded system or may reside on a PC. FIG. 1 is a block diagram of the receiver chip and the host processor. This system is capable of processing signals in difficult environments such as inside buildings or in so-called urban canyons where the signal levels are very poor by employing assistance data and integrating incoherently for longer across the data bits thereby enhancing the overall received signal sensitivity which, in turn, improves signal acquisition and offers high performance position fixes, even in indoor environments.

As in conventional satellite signal receivers, the GNS4540 receiver chip 10 has a satellite signal receiver with a radio frequency stage 10A for receiving and down-converting code-modulated signals from a number of satellites, and a baseband block 10B including a correlator engine 12 to receive, track and decode the down-converted satellite signals to provide signals containing partial pseudo-range measurements for respective satellites. The data processing host system 14 is configured to receive signals containing the assistance data from an external source such as a telecommunications network via a data assist port 14A as well as the signals containing the partial pseudo-range measurements over a serial interface link 16.

Figure 2:
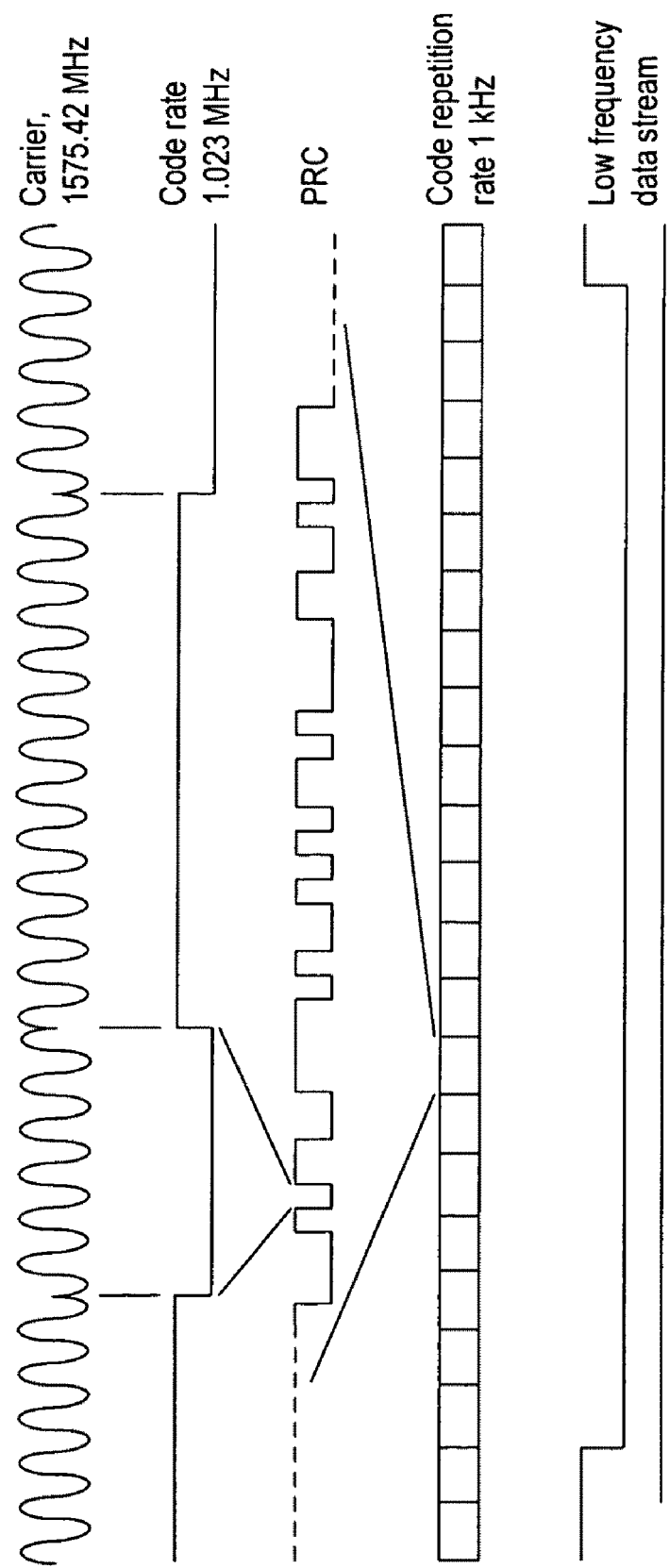
FIG. 2 is a waveform diagram illustrating the GPS signal.

The "pseudo-range" is an estimate of the time delay of the signal path between a satellite and the receiver. This path delay is typically in the order of 70 milliseconds. The GPS signal is illustrated in the waveform diagram of FIG. 2. The L1 carrier, at 1575.42 MHz, is modulated with a pseudo-random spreading code with a basic code rate of 1.023 MHz. Each chip contains 1540 carrier cycles. The pseudo-random code (PRC) is 1023 chips long (i.e., 1 millisecond). The code is repeated at a 1 kHz rate. At a much lower frequency, the signal is modulated with a data stream. This lower frequency or data rate is 50 Hz, which means that one bit of the data stream occupies 20 milliseconds. The spreading code (PRC) repeats every millisecond, which means that synchronising with the code alone provides a fractional part of the pseudo-range (in milliseconds). The integer millisecond part of the pseudo-range is estimated by other means, conventionally by decoding the data structure on each satellite to be used.

The receiver 10 has a frequency-locked loop (FLL) of which the local oscillator 10-1 is a part, which synchronises with the incoming carrier. The correlator engine 12 includes a code loop which synchronises with the pseudo-random code (PRC) producing resolution of less than 1 microsecond, with ambiguity of 1 millisecond. It is then possible for the embedded processor subsystem 18 or the host system 14 to synchronise to the data-bit transitions of the low frequency 50 Hz GPS navigation message data stream, whether or not the data is successfully decoded. This yields a resolution of less than 1 millisecond, with a 20 millisecond ambiguity.

Figure 3:
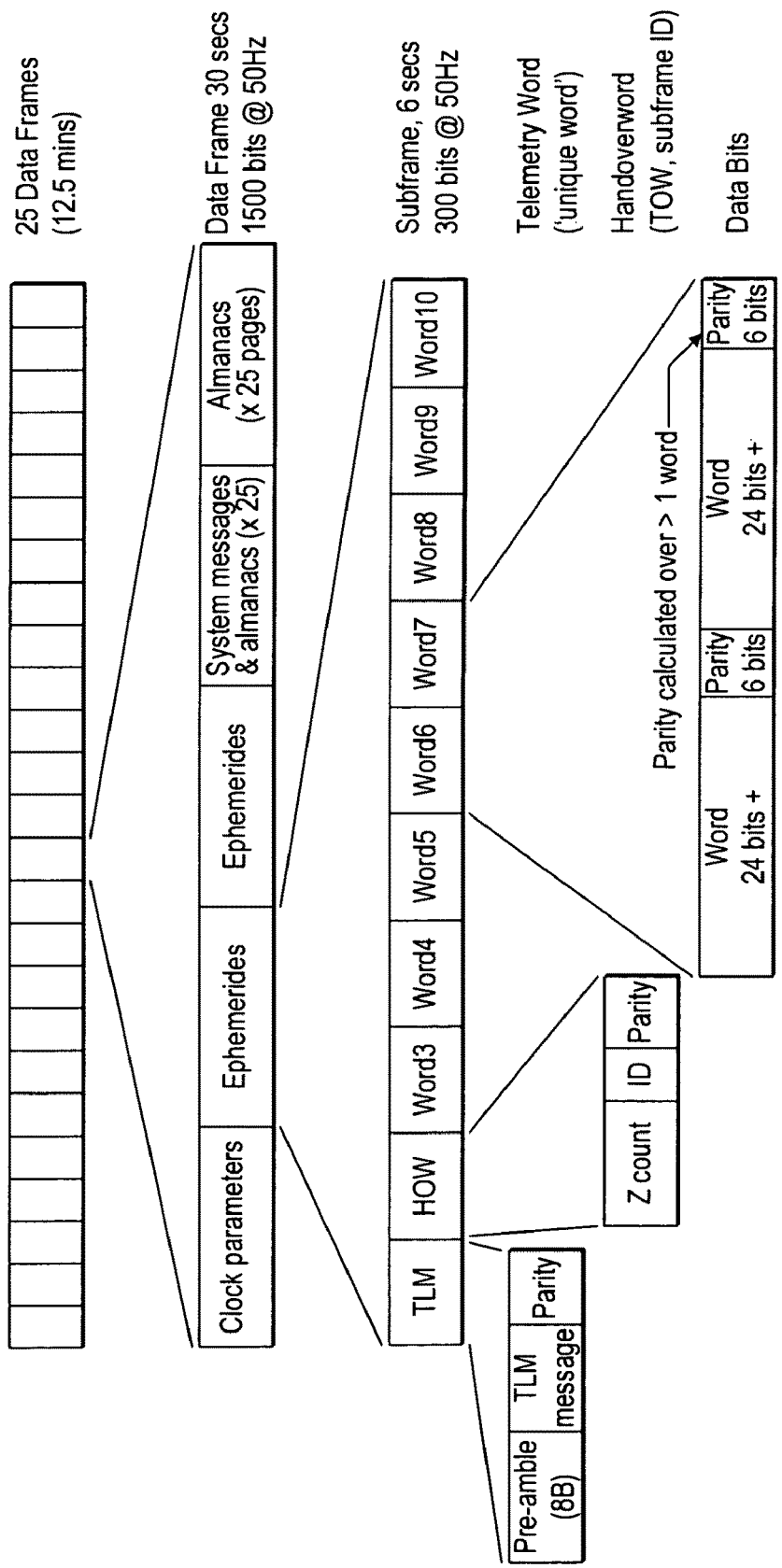
FIG. 3 is a diagram illustrating the data format of the low frequency data stream carried by the GPS signal.

Referring to FIG. 3, the data stream represented by the GPS data signal includes 25 data frames, together occupying 12.5 minutes. (These 25 frames are repeated every 12.5 minutes.) Each such data frame occupies 30 seconds and contains 1500 data bits at the 50 Hz data rate, as shown in FIG. 3. Each frame comprises five sub-frames containing data relating to clock parameters, ephemerides (two sub-frames), a sub-frame for system messages and almanacs (sub-frame 4) and further almanacs (sub-frame 5). Each sub-frame 4 contains one page out of 25 pages of system messages and almanacs, successive 30 second data frames containing successive ones of the 25 pages. Similarly, successive 30 second data frames contain successive ones of 25 pages of almanacs in sub-frame 5. Each sub-frame is six seconds long and contains 300 bits of the 50 Hz data stream, split into 10 data words, as shown. (In FIG. 3, "TLM" denotes the telemetry word (the "unique word"), and "HOW" denotes the so-called handover word which includes the TOW (time of week) and the sub-frame ID (identity). Each word has 24 or more data bits plus six parity bits. (Parity is calculated over more than one word.)

When signal strength is sufficient, sub-frame synchronisation is performed by the host system 14 (FIG. 1) by decoding the data, which yields a resolution of less than 20 milliseconds, with a 6 second ambiguity. Decoding the data in the sub-frame provides time-of-week (TOW) to 1.5 seconds, and a week number.

Additional data, such as ephemeris/orbit and clock parameters, is spread over plural sub-frames, as described above.

The absolute times associated with the satellite transmissions are determined in conventional GPS receivers by reading the TOW data in the navigation message of the GPS signal. The TOW count is reported in the navigation message data stream every 6 seconds, giving the time elapsed since the beginning of the current GPS week.

The 50 Hz data stream is aligned with 1 ms GPS C/A code transitions so that the arrival time of a data bit edge (on a 20 ms interval) resolves the absolute transmit time to the nearest 20 ms. The C/A code repeats every 1 ms and is therefore ambiguous every 1 ms of GPS time. Precision synchronisation to bit boundaries can resolve the absolute transit time to one millisecond or less. The GPS navigation message comprises the system time, satellite ephemeris and almanac information.

In the GPS receiver, once the navigation solution converges the time, given four or more satellites, and the time of arrival (ToA) measurements from at least four different satellites are obtained, and valid satellite orbit data are received, time can be recovered from the demodulated satellite data stream, the data sub-frame, the data bit sync (in ms) and a combination of the code chip count and the code phase (in sub-milliseconds, for example to 50 ns).

At strong signal levels (signals above −145 dBm), the data bit edges are detectable, the carrier tracking provides the data bits, and sub-frame synchronisation can be established. Time is then established from the GPS data stream and bit edges, which are easily detectable to sub-milliseconds.

Timing performance is limited by the ability of the receiver to resolve the correct data at signals below −145 dBm. Assistance data, from an external source, is then required to obtain the valid satellite orbit information since the receiver cannot extract the navigation data from the received signal and it is not possible for the receiver to synchronize to the incoming bits, words or sub-frames. Once a fix is established, the offset between GPS time and local time can be converged by the navigation solution to better than ±50 ms, but this resolution does not allow exact millisecond synchronisation at low signal levels.

For medium signals (signals between −145 dBm and −150 dBm) where integration times are still less than 20 ms but the bit edges are "blurred", the receiver starts a bit synchronisation accumulator per satellite tracked to search for the data bit edge. The bit synchronisation algorithm employed is a transition detection technique which extracts timing information from the received GPS signal. Since there are 20 C/A code 1 ms epoch periods per data bit and the bit edges are aligned with the beginning of a C/A code, the bit synchronisation algorithm breaks the assumed data bit period into 20 1 ms timeslots. A detected phase reversal is added to the appropriate integrator slot according to the 1 ms timeslot in which it is detected. Over time, one of these slots integrates up much higher than the others, and the correct millisecond is detected using a threshold mechanism. A longer integration period increases the probability of correctly detecting the data bit transition due to the occurrence of more bit transitions. Also, a longer integration period provides improves noise immunity. Hence, in environments with weak signals, the bit synchronisation algorithm can be integrated for long periods, and, given assistance to better than 3 seconds, just a single successful sub-frame decode is all that is required to establish exact time. This can be achieved at somewhat lower signals than continuous error-free data decoding, e.g., −150 dBm.

With weaker signals (e.g., signals below −150 dBm), only the code phase can be extracted from the signal. Hence, a similar bit synchronisation mechanism to the one used for medium signals is applied. However, the length of integration required for weak signals and the signal dynamics caused by clock offset, satellite motion and, for instance, user motion induced Doppler effects, cause the bit edge to slew across timeslots. As a result, the bit synchronisation technique has a lower probability of finding the correct millisecond slot. It is possible to find a few adjacent milliseconds where the data edge is located, and refer to this as "approximate millisecond synch." This is good enough to use for the navigation solution, but not for timing. So at this point the sub-millisecond time solution displays good accuracy, but may suffer an N×1 ms offset.

Data bit synchronisation is carried out in the embedded processor system 18 of the GPS receiver 10. At low received signal levels it is still possible to perform data-bit synchronisation notwithstanding the inability to decode the data stream.

The integration period for bit synchronisation, being extended in order to adapt the bit synchronisation algorithm for weak signal environments, results in an improvement in the ability to find the bit transition without a corresponding increase in the rate of dismissals.

The threshold bit synchronisation algorithm is improved by using a threshold technique that ensures that the ratio of the timeslot with the maximum energy to the timeslot with the second highest energy is greater that a pre-determined threshold. Hence, if the ratio is smaller than the threshold, no decision is made and the bit synchronisation algorithm is re-initialised. This approach improves the robustness of the bit synchronisation algorithm, especially in scenarios with weak signals or situations where there is a lack of data bit transitions in the received signal during the integration period.

The threshold is selected to provide an optimal probability of detecting the correct millisecond slot in the presence of weak signals and allow the best trade-off between the error rate in bit synchronisation and the time required to declare the bit transition found. The threshold is a function of the signal strength, the length of the integration period and the desired error rate. If the detection threshold is too high, the probability of detecting the bit transition at weak signal levels is low, resulting in an increased bit transition detection time. On the other hand, a low threshold results in false alarms, leading to a lower probability of finding the correct millisecond slot.

As mentioned above, the probability of correctly detecting the data bit transition for weak signals is reduced due to the fact that since the integration period required for the timeslot with the correct bit edge to exceed the detection threshold is long, the bit edge can slew across adjacent timeslots due to the frequency offset caused by drift and Doppler shifts present in the GPS signal.

To compensate for any frequency offsets, a feedback loop is employed to improve the accuracy of the bit synchronisation estimates over long integration periods. In this way it is possible to compensate for e.g. Doppler shifts of the data stream data rate from 50 Hz as timed by the local receiver clock.

The frequency compensation function can be implemented in a number of ways using the embedded processor subsystem 18 (FIG. 1). A first method entails extending the bit synchronisation process to a two-dimensional search in bit position and frequency. In this approach, the bit synchronisation algorithm computes the 20 timeslots for the different possible bit positions at multiple frequency offsets. The timeslot with the maximum energy is the one with the integration correctly aligned with the data bit positions. The 20 timeslots from that frequency bin may then be used to evaluate each bit position estimate. This approach is, however, computationally expensive.

A second approach involves using the frequency tracking loop to aid the bit synchronisation algorithm so as to prevent the bit edge slewing across adjacent timeslots due to differences and changes in the satellite dynamics.

A third method, based on 20 ms integrations, increases the probability of correctly detecting the data bit transition for weak signals. This approach, however, has high memory requirements.

Figure 4:
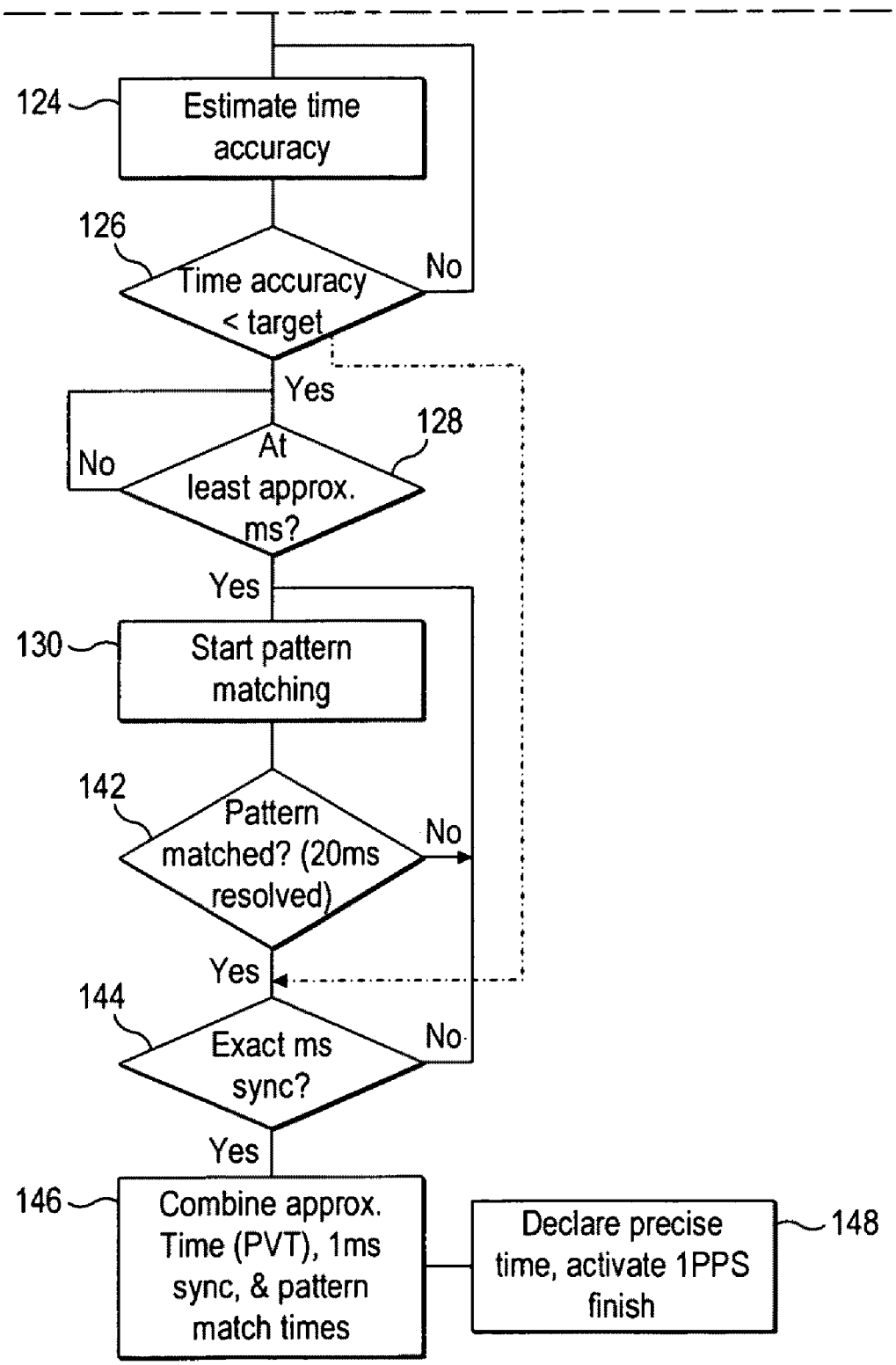
FIG. 4 is a flowchart of a method of producing a precise time solution in accordance with the invention.

Reference is now made to FIG. 4 which is a flow chart illustrating the software steps performed by the embedded processor subsystem 18 and the host data processing system 14 of the time reference system described above with reference to FIG. 1. Initially, assistance data is collected by the host system via the data assist port 14A (FIG. 1), providing ephemeris and almanac information and an imprecise time value (step 102). The position assistance is preferably to nearer than 100 km to provide for good integer 1 millisecond pseudo-range resolution.

Next, a search for strong SV (space vehicle) signals is performed (step 104) and if an SV is found, a position-velocity-time solution is performed using data decoding of the data stream from at least one SV (steps 106, 108). If no strong signal is located, the above-described low signal search is performed by the embedded processor subsystem (step 110). Whenever an SV is found (step 112) the bit synchronisation routine described above (step 114) is commenced. Approximate synchronisation may be used to adjust coherent integration for improved sensitivity. When four SVs have been located (step 116) an initial position-velocity-time (PVT) solution is possible, even with weak signals (steps 116, 118), the position solution being provided either using the calculated integer millisecond (step 120) or with additional ambiguity resolution (step 120) depending on whether the initial position is known to within 100 km or not.

In summary, the steps described above increase the probability of correctly detecting data bit transitions in environments with extremely weak signals.

After the receiver detects the bit transition, it starts demodulating the navigation message in order find out where it is in the received signal. However, when the received signal is very weak, the receiver finds it difficult detecting the phase inversions between data bits and so cannot reliably demodulate the received GPS signal, leaving a 20 ms ambiguity within a ±50 ms resolution established by the navigation solution. This is good enough for 20 ms integration alignment with the data bits and for the positioning solution, but not for timing.

The receiver next performs a process including pattern matching of pre-selected data sequences in the low frequency data streams of the received satellite signals, one such data sequence being the 8 bit GPS data preamble which appears at the beginning of each sub-frame in the data stream (see FIG. 3). However, repetitive or non-repetitive data sequences can be used. Pattern matching resolves the above-mentioned 20 millisecond ambiguities. This can be performed by different correlation techniques according to the sequence chosen, despite the fact that in weak signal conditions the satellite data itself cannot be decoded.

Referring again to FIG. 4, the host system 14 firstly estimates the accuracy of the preliminary time solution obtained after the bit synchronisation process described above (step 124). This accuracy estimate is compared to a target time accuracy (step 126) which is set according to the pattern length of the selected data sequence or sequences. The target time accuracy is set so as to be smaller than the range of a predetermined auto correlation function limit set to obtain good correlation discrimination. If the estimated time accuracy is less than the target, the embedded processor subsystem proceeds, via a check that the bit synchronisation process has resulted in at least approximate alignment of the data bits (step 128), to pattern matching (step 130 and FIG. 5).

In the absence of operation of a phase-locked loop (PLL) (which is the case at low signal levels), it is not possible to run long coherent integrations for correlating the pre-selected data sequences. However, the preliminary position solution obtained from the position solution step 120 or 122 allows localisation of the time uncertainty such that there exists only a small number (e.g. 3 to 5) ambiguous time options. This is because, as seen from FIG. 3, a data sequence appearing in every sub-frame occurs every 6 seconds and there is only a small number of eligible sub-frame alignments within the time uncertainty resulting from the processes performed in the receiver so far (this uncertainty being typically plus or minus 30 milliseconds, although sometimes as much as plus or minus 50 milliseconds).

Figure 6:
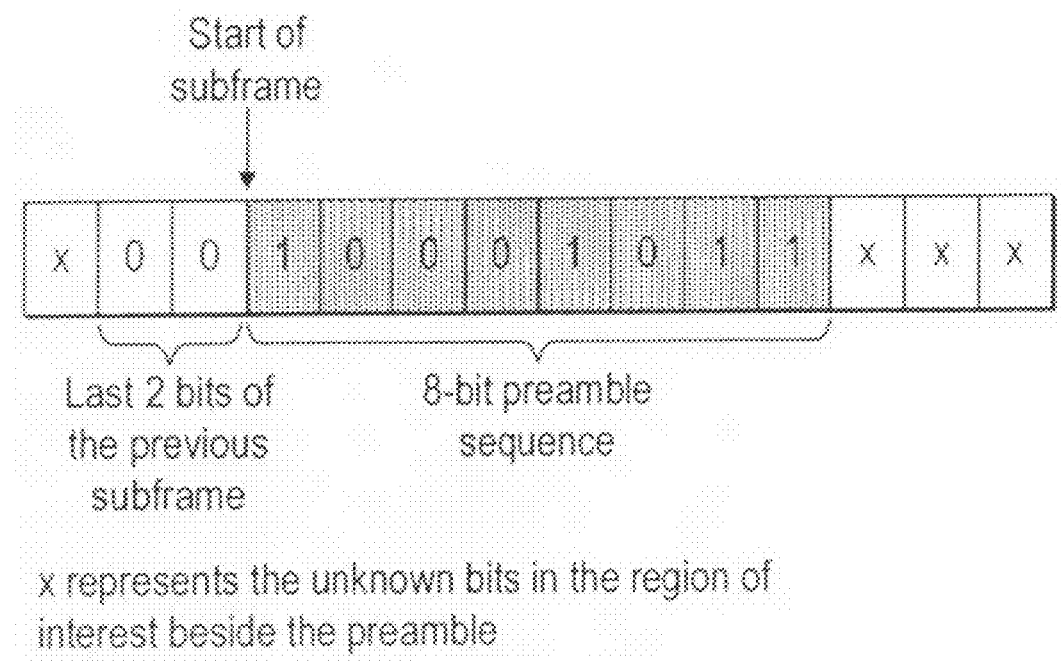
FIG. 6 is a bit diagram showing part of the low frequency data stream including the GPS preamble.
Figure 7A:
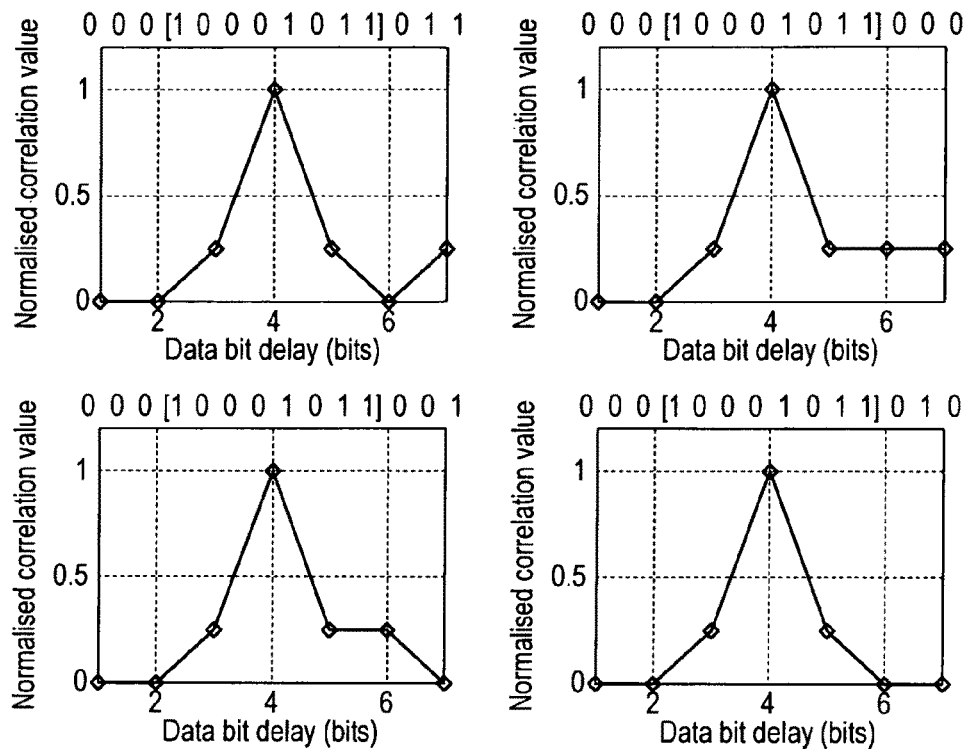
FIGS. 7a, 7b, 7c and 7d are correlation diagrams showing the auto-correlation properties of the GPS preamble in the presence of different preceding and subsequent bit values.
Figure 7B:
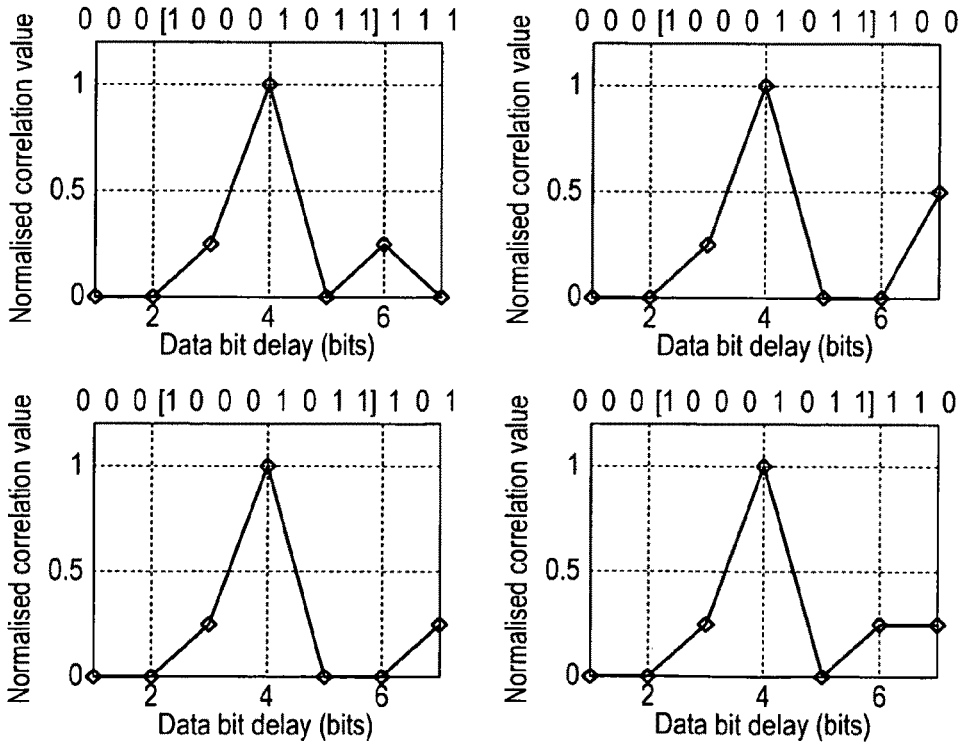
Figure 7C:
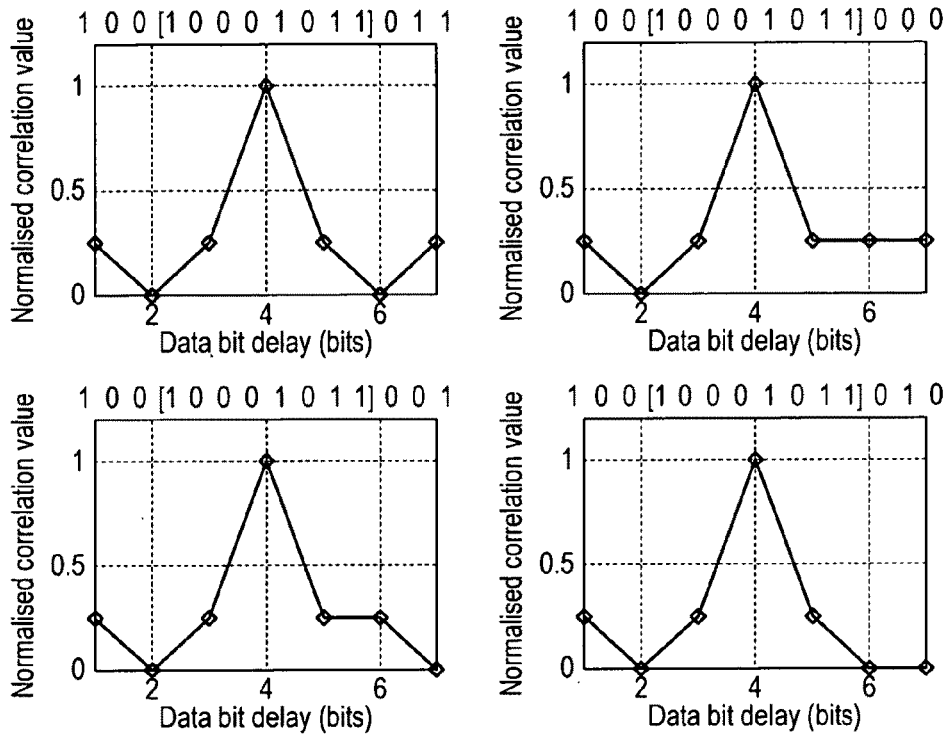
Figure 7D:
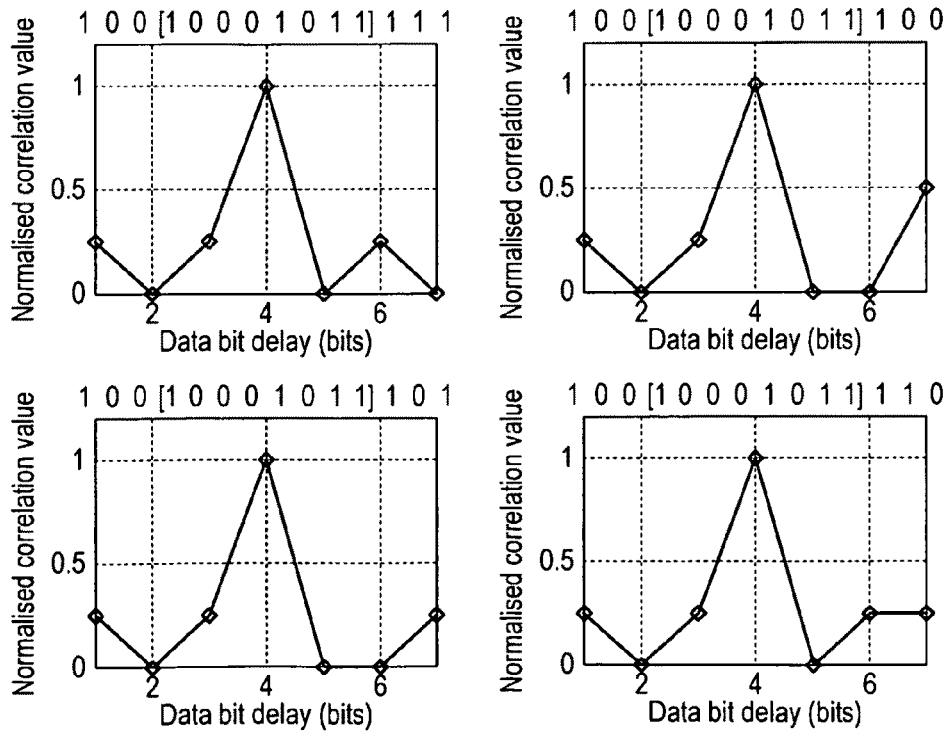

The synchronisation with the data bit edges having already been established, the problem of ambiguity resolution is reduced to resolution of this small number of ambiguities. The 8 data-bit synchronisation or preamble sequence of the satellite data, which is shown in FIG. 6, has good auto correlation properties over plus or minus 3 data-bits, as is seen in FIGS. 7a to 7d, even allowing for the unknown state of signal data when misaligned. As seen from FIG. 6, the 8-bit preamble sequence comprises the bits 10001011. The last two bits of the previous sub-frame are 00. The bits denoted by "x" are unknown bits in the region of interest beside the preamble. FIGS. 7a to 7d plot normalised correlation values resulting from the auto correlation of the pre-selected preamble sequence in the absence of noise. The values are plotted for aligned and misaligned incoming and reference sequences in the presence of different data values in the bits before and after the pre-selected data-bit preamble sequence. It will be seen that this sequence has excellent auto-correlation properties, the normalised correlation value peak occurring with alignment being at least double the values obtaining with misalignments of +/−1, 2 and 3 data bits. It will be seen that the correlation margin, i.e., the ratio of the normalised correlation value at alignment compared with values of misaligned sequences, is at least 1-to-2 and, with offsets of one or two bits, 4-to-1 or less. In general, a margin of 2-to-1 over +/−2.5 bits gives good results, although smaller margins are feasible.

In the preferred receiver, the pattern matching is performed by direct correlation using coherent integration for each of the time solution options over a short interval, commensurate with the expected frequency accuracy. In particular, such integration, owing to the lack of the PLL, is performed over an interval of less than or equal to the reciprocal of the frequency stability of the frequency-locked loop. In a situation in which integration of a full 8 data-bit sequence is insufficient, particularly owing to poor frequency stability in weak signal conditions, integration beyond a single synchronisation sequence may be performed, compensation for possible data inversions between synchronisation messages being carried out (i.e. using incoherent techniques in the extended integration).

Whether coherent or a combination of coherent and non-coherent integration is used, the system detects the best correlation result for the different time-solution options.

Figure 5:
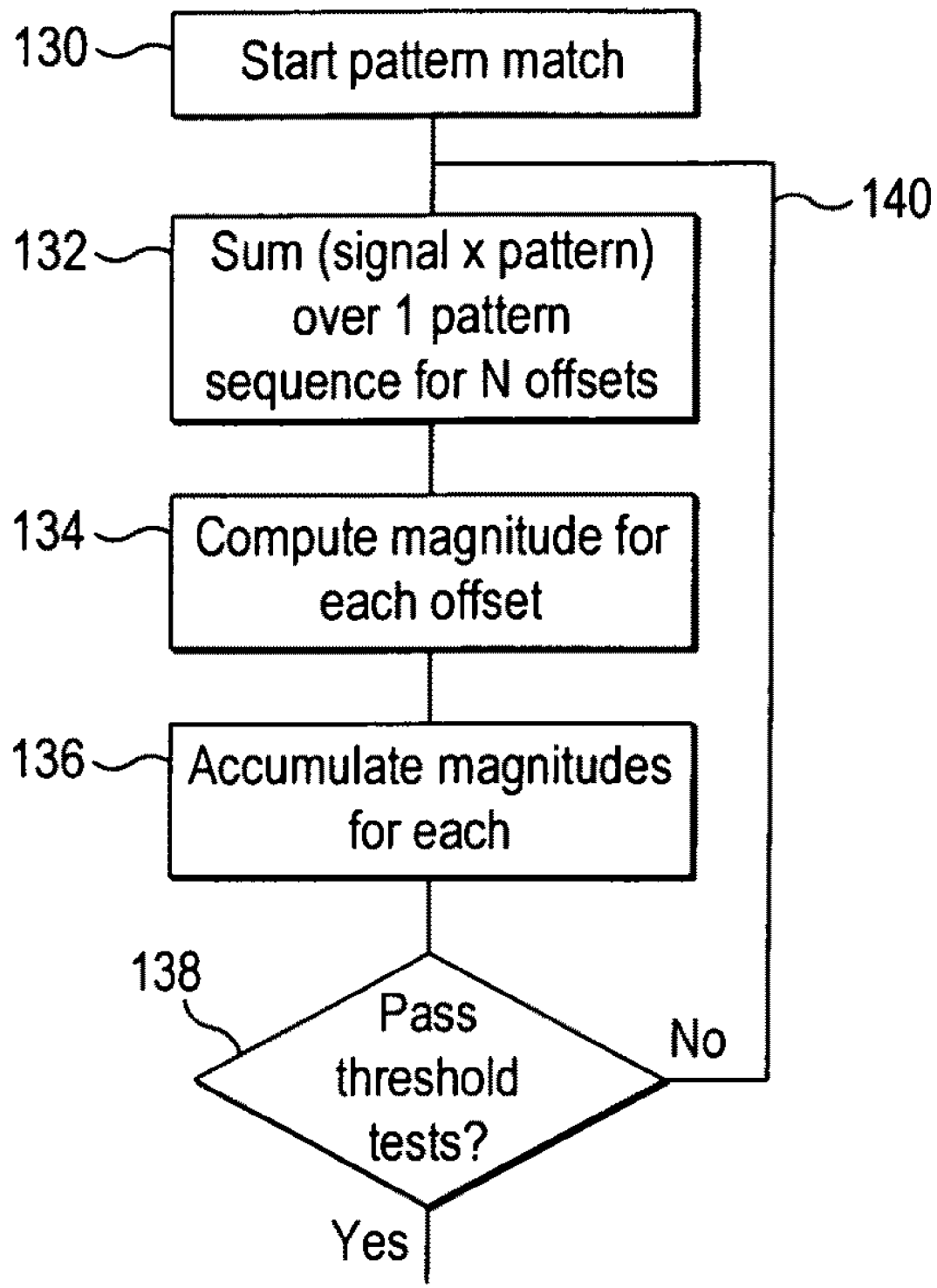
FIG. 5 is a flowchart showing a pattern matching process forming part of the flowchart of FIG. 4.

Referring to FIG. 5, the pattern matching routine, once started (step 130 in FIGS. 4 and 5), comprises a "coherent integration" step (step 132) in which the previous pattern or the expected pattern (plus/minus 1 for GPS BPSK modulation) is multiplied with complex samples over the lengths of the selected pattern. This is done for each of the possible delays (time-solution options) under test. Next, the magnitude of the result (obtained by summing the multiplication products) is computed (step 134) for each time-solution option or offset ("offset"), the magnitude removing sign and phase (which are not consistent from one coherent integration to the next). In step 136, the magnitudes for each offset are accumulated by incoherent integration.

Threshold tests are then performed (step 138) to detect the largest correlation peak with enough margin (e.g. by a comparison test comparing the biggest peak with the next biggest peak, or the biggest peak with the average correlation output, etc.). A typical margin is 2-to-1. A minimum number of cycles of the loop 140 may be required before testing.

Returning to FIG. 4, when pattern matching is achieved (step 142) and exact bit synchronisation (as opposed to approximate synchronisation tested in step 128) (step 144) is achieved, the preliminary time solution can be resolved to precise time in the host processor to obtain the precise time using e.g. a Kalman filter (steps 146, 148).

Pattern matching may also be performed using a shorter sequence than the 8-bit sequence referred to above, as will be described below, the advantage being that the frequency sensitivity is lower and the auto correlation pattern to discriminate is less variable. A further alternative is to perform a differential-bit method ("differential integration") as also described below, whereby the pattern to be matched is not the navigation data from the satellite data stream, but the differential-demodulation of successive data bits. This pattern is more frequency tolerant, but its auto-correlation function is also altered. In the case of the GPS preamble, the resulting auto-correlation shows the discrimination to be poor, but other data sequences could be identified for which the auto-correlation, and discrimination would be satisfactory for the differential correlation method—which is more frequency tolerant and may use longer data sequences.

The combination of the preliminary time solution and the pattern matching result completes the combination necessary to establish "Precise time." Accordingly, Precise time has been established as a composite of coarse time, positioning time using, e.g. the Kalman filter, bit-synchronisation at modulo 20 milliseconds, data or differential-data ambiguity resolution plus or minus 3 data-bits as described above, and code phase matching synchronisation (modulo 1 microsecond). Typically, this establishes time to an accuracy of 50 nanoseconds. It will be noted also that, compared to establishing time from code chip (modulo 1 millisecond) synchronisation and attempting directly to match data across a whole 1 second coarse time uncertainty (i.e. 1000 search bins), the method described above requires the data pattern only to resolve a small number of options (say 5 bins). This means that a similar threshold will produce a "false alarm" rate of $\frac{1}{200}$ by comparison. Alternatively, lowering the threshold algorithm for the same false alarm rate produces detection at a lower signal level. Since data bits occur continuously through the signal at a 50% rate, but synchronisation data-bits occupy only 8 bits per 6 second sub-frame (i.e. 2.7%), the use of synchronisation data bits only leads to a slow process. In many applications this is not a problem, but the method is not restricted to using synchronisation bits, and any sequences displaying good autocorrelation may be used.

The combination of the data pattern matching result, i.e. the selected time-solution option, may involve, in step 146 (FIG. 4), matching a pattern matching result from the signal transmitted by just one of the satellites from which signals are being received. In other words, when the 20 millisecond and 1 millisecond ambiguities in the signal from just one satellite have been resolved, the assembly of the preliminary position and time solution and the other data referred to above results in solutions in which absolute time ambiguities are resolved. The position-time preliminary solutions already obtained from the other satellites can be adjusted accordingly in the combination process represented by step 146 to yield the required precise time output.

The auto-correlation based pattern selection, and subsequent pattern matching process will now be described in more detail using the example of the 8-bit preamble sequence in the satellite data stream.

Each sub-frame in the GPS navigation message starts with an 8-bit preamble sequence—'10001011', as shown in FIG. 6, which is used during the sub-frame synchronisation process. As the length of the preamble sequence is fixed, a correlation between it and the received data bits can be employed to enable the receiver achieve synchronisation since it effectively determines the beginning of a sub-frame and subsequently locates the boundaries of the received signal and then tracks each sub-frame.

The auto-correlation properties of the preamble sequence are of particular importance and can be obtained by correlating the known words with a shifted replica of the preamble over the range of interest. Since the last two bits of every word in a GPS sub-frame are zero [ICD-GPS-200, 1991], these bits can be included when determining the auto-correlation properties of the region either side of the correlation peak. Given that the navigation solution converges the time, given more than four satellites to approximately ±50 ms (that is approximately ±2.5 data bits), the region (3 bits) either side of the autocorrelation peak should have a low cross-correlation values in order to improve the ability to identify the start of the sub-frame. As illustrated in FIG. 6, there are 4 unknown bits in the region of interest beside the preamble; that is 16 possible permutations of data bits.

The GPS preamble proves to have very good autocorrelation properties over the required time uncertainty (±2.5 bits), and for all adjacent data bit permutations, are also illustrated in FIGS. 7a to 7d.

The preamble sequence is matched to the received signal and a correlation peak is formed by shifting a replica data bit pattern across the samples of the tracked signals in 20 ms steps until a match is found. This essentially increases the integration period out to the length of the data segment used, which for the GPS data preamble is 160 ms. This improves the sensitivity at which precise time synchronisation is achieved by about 9 dB compared to the 20 ms integration period. However, it increases the receiver's sensitivity to frequency errors, caused by user dynamics and oscillator stability. A coherent integration period of 160 ms implies a relatively narrow frequency bandwidth of 6.25 Hz. The frequency error has to be taken into account when increasing the coherent integration period as large frequency errors can degrade the signal sensitivity and thus can reduce the benefits of long coherent integration periods.

An alternative approach involves correlating the differentially demodulated received GPS signal with a locally generated differentially demodulated version of the GPS preamble. The differentially coherent accumulation is performed between two consecutive outputs of coherent integration. That is, the latter sample is multiplied by the conjugate of the previous sample and these correlation variables are then accumulated in order to obtain the differential coherent output. The real part of the differential integration, also known as the dot product, is then correlated with the dot product of the preamble. The dot product forms the product:

$$Y_m = I_{m-1}I_m + Q_{m-1}Q_m \quad (1)$$

where m represents the coherent delayed version of the corresponding sample.

When the dot product is above zero, no data bit change has occurred. That is, it indicates the absence of a phase reversal between two consecutive segments of signal samples, whereas when the dot product is below zero, a data bit transition has occurred (that is a phase reversal has been detected within two consecutive segments of signal samples).

Figure 8:
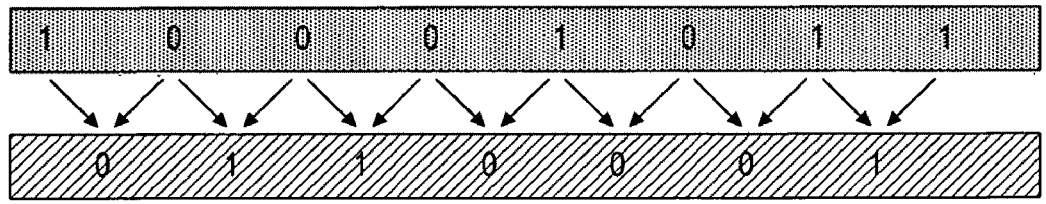
FIG. 8 is a bit diagram representing differential correlation of the GPS preamble sequence.

The differentially demodulated sequence—'0110001' for the GPS data preamble is shown in FIG. 8.

Figure 9:
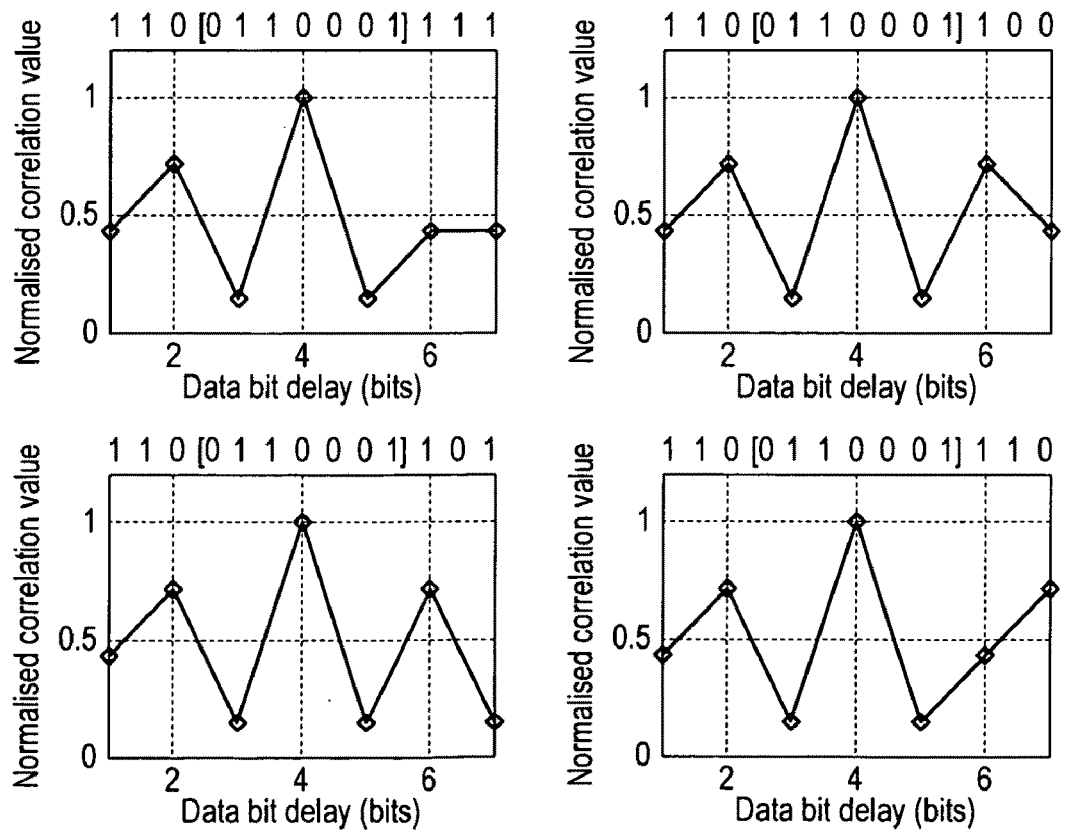
FIG. 9 contains diagrams showing the auto-correlation properties of the GPS differentially demodulated preamble, for different preceding and subsequent data bit values.

Although this technique provides better performance in the presence of frequency offsets, the GPS differentially demodulated preamble does not have very good cross-correlation properties over the required time uncertainty (±2.5 bits) as illustrated in FIG. 9. This affects the probability of correctly detecting the main peak since this is dependent on the ratio of the auto correlation peak to the highest side peak.

Accordingly, although differential preamble detection yields better performance in the presence of frequency offsets, it had less good correlation properties over the required time uncertainty—but there will exist other data sequences for which the auto correlation is satisfactory.

Figure 10:
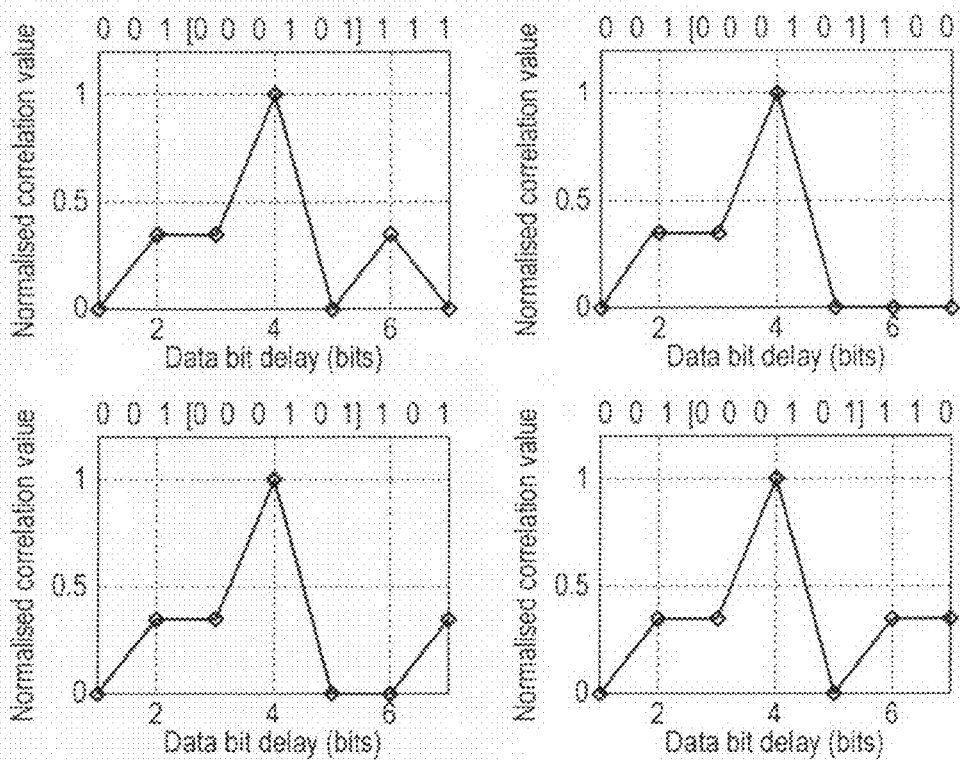
FIG. 10 contains correlation diagrams illustrating the auto-correlation properties of a central part of the GPS preamble sequence.

Another alternative approach is to use a sub-sequence of the GPS data preamble. This enhances the performance in the presence of frequency offsets compared with the case where the full length preamble is used (that is, it improves the frequency bandwidth from 6.25 Hz to 8.3 Hz). Using a 6-bit sequence (an integration period of 120 ms) improves the sensitivity at which precise time synchronisation is achieved by 7.78 dB compared to the 20 ms integration period. FIG. 10 shows the correlation properties of a 6-bit subsequence of the GPS preamble—"000101." Hence, this approach searches for the preamble correlation across 6 bits of the preamble.

In addition, using a subsequence of the preamble reduces the number of unknown bits on either side of the chosen sequence, as illustrated in FIG. 10.

Accordingly, a subsequence of the GPS preamble has good correlation properties and can be employed to resolve the 20 ms ambiguity. A pattern matching algorithm is used to exploit these correlation properties and resolve the 20 ms ambiguity.

The pattern matching algorithm is accomplished by correlating the received data sequence with a known data sequence and when a correlation result above a specified threshold is produced, using an algorithm to add confidence to the prediction. This algorithm relies on the knowledge that the synchronisation word will appear in subsequent sub-frames and thus the probability of detection can be improved and the probability of false synchronisation reduced by performing additional correlations in subsequent sub-frames.

When, as an alternative, non-repetitive sequences are selected, similar properties can be achieved when sequences in subsequent sub-frames are known or can be predicted.

Figure 11:
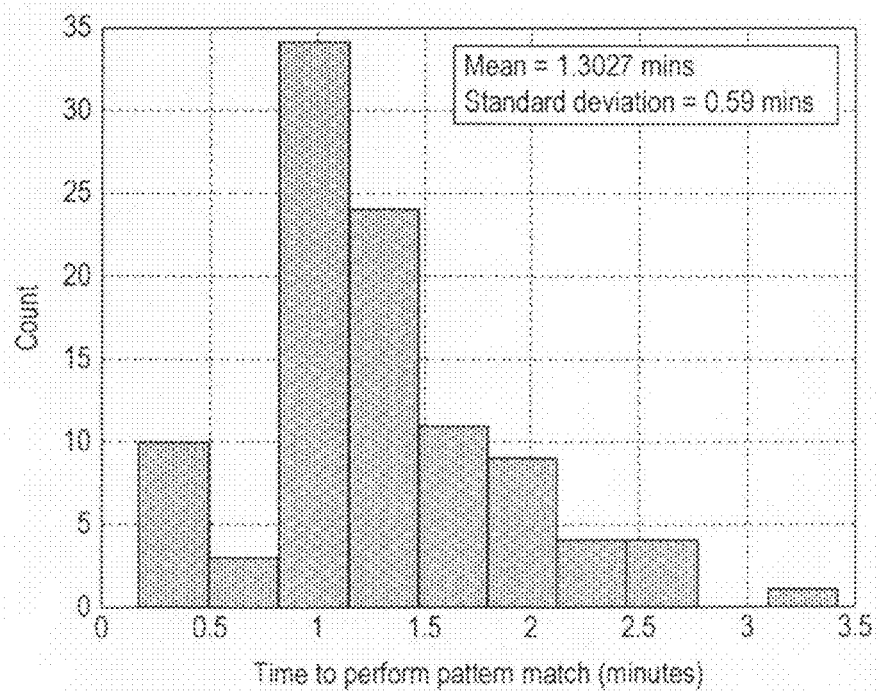
FIG. 11 is a graph illustrating the time taken to perform a pattern match with an incoming signal level of −155 dBm.

Combining the results of multiple sub-frames increases the probability of detection of the synchronisation word. One method of combining multiple sub-frames is to sum the correlation results from multiple sub-frames before comparison with the detection threshold. FIG. 11 shows the time taken to perform the pattern match from 100 trials on a GPS simulator with the signal level for all the satellites set to −155 dBm.

Summarising, the system in accordance with the invention makes use of a pattern matching algorithm that has been developed in order to resolve the 20 ms ambiguity. It takes advantage of the periodic broadcast of the GPS data preamble to enhance the performance of the timing synchronisation.

In the ST-NXP GNS4500 receiver platform, the navigation solution uses a number of possible mechanisms to converge time to better than 100 ms, which is sufficient for establishing SV orbital position for a fix but not sufficient for a precise timing receiver. The navigation solution establishes the time, given more than four satellites to approximately ±50 ms. FIGS. 12 to 18 show that this time estimate is dependent on the signal conditions. This estimate provided by the navigation solution is employed in the GPS time reconstruction to trim the time uncertainty.

A series of tests were performed using signals from (1) a GPS signal simulator, (2) an indoor antenna and (3) an attenuated roof antenna. The indoor antenna was placed inside a file cabinet in order to model a harsh indoor environment containing highly attenuated multipath signals. Each test run lasted 30 minutes. Table 1 summarizes the initial conditions used for all of the tests.

TABLE 1

| Initial test conditions | |
|---|---|
| Horizontal position uncertainty | = 3,000 km |
| Initial horizontal position error | = 2,900 km |
| Vertical position error | = 100 m |
| Initial time error | = 2 seconds |
| Initial frequency uncertainty | = 0.6 ppm |

The assistance data is supplied via an A-GPS link to the test receiver and an initial position uncertainty (the Net Assist position) of 3,000 km was used. The initial position error was set at approximately 2,900 km from the true position. Hence, the initial reference position provided to the test receiver is in error of 2,900 km from the true position.

Figure 12:
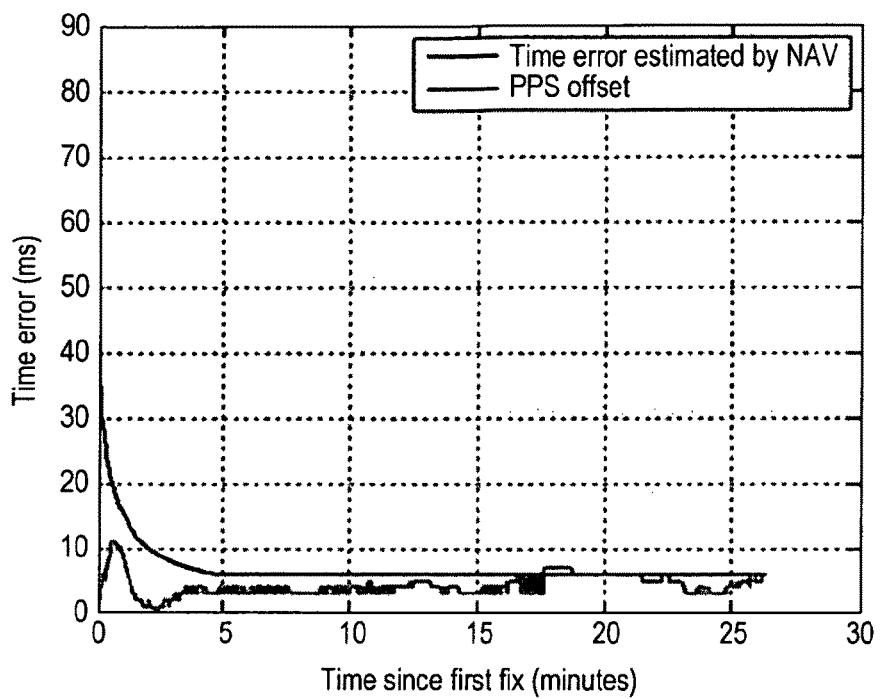
FIG. 12 is a graph illustrating the time error estimated by a navigation solution and a PPS offset using a GPS simulator.
Figure 14:
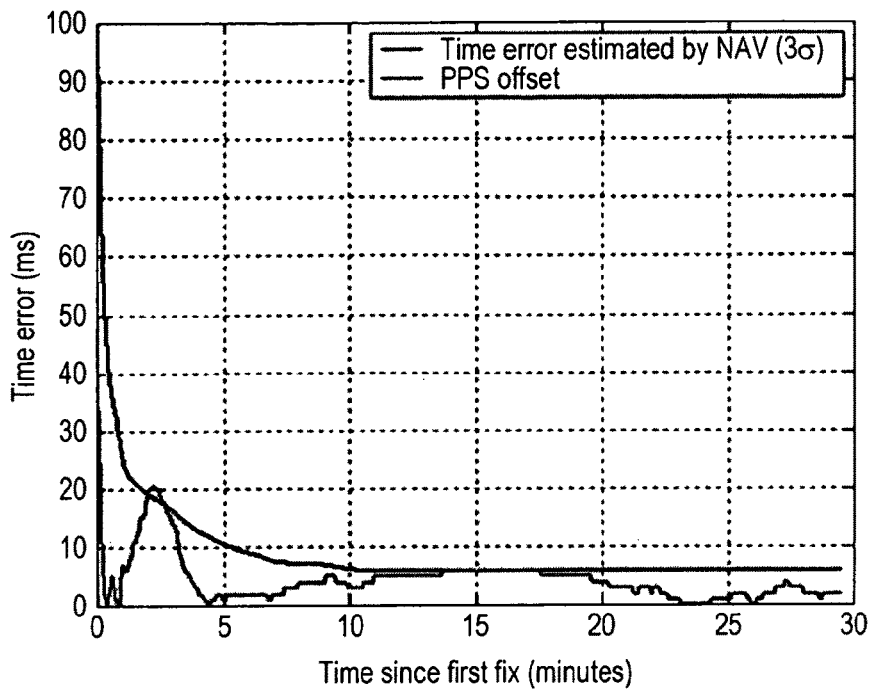
FIGS. 14 and 15 are time error and numbers of satellites graphs corresponding to FIGS. 12 and 13 obtained using an indoor antenna instead of a GPS signal simulator.
Figure 15:
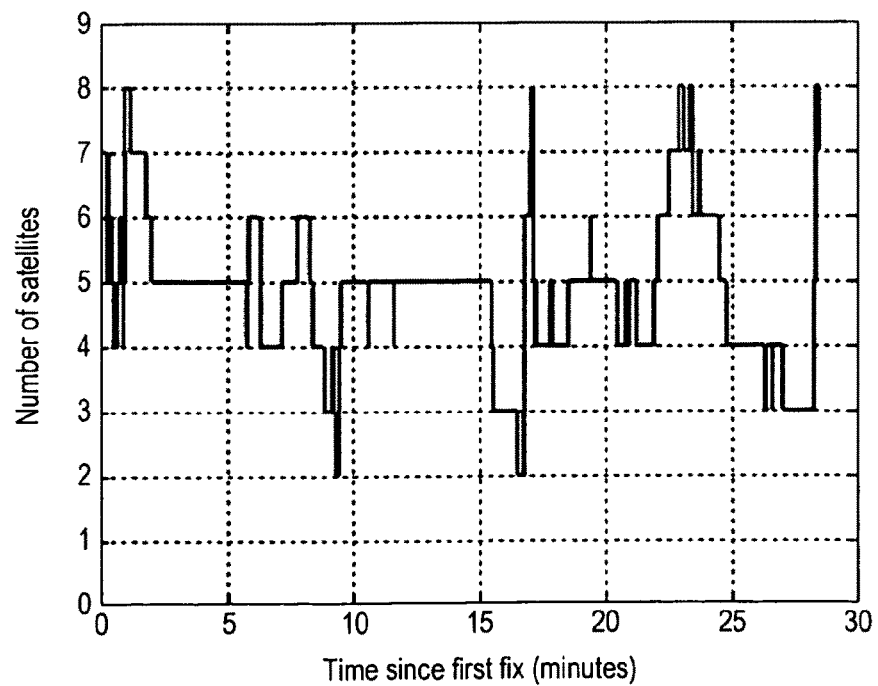
Figure 16:
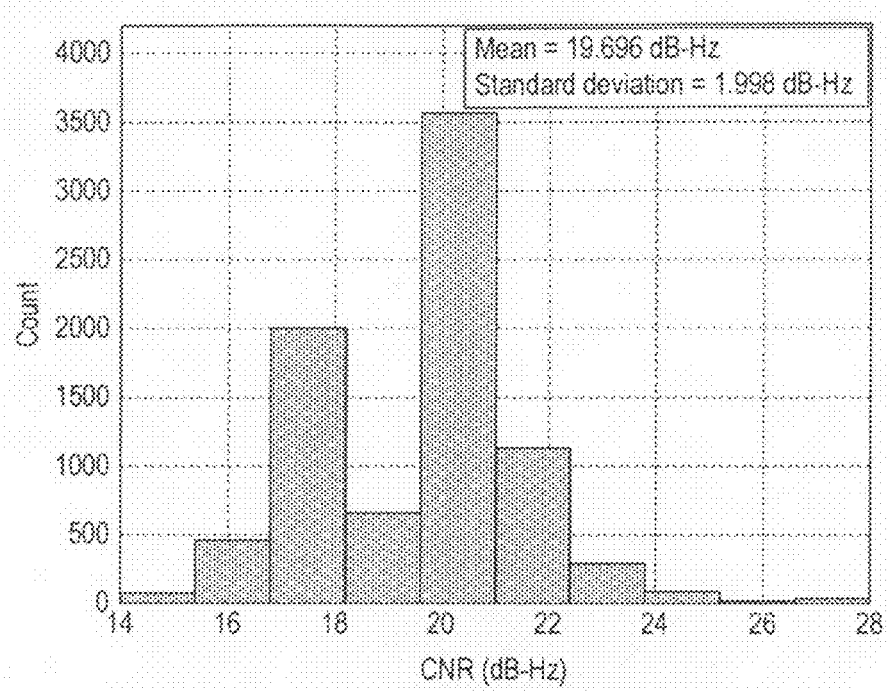
FIG. 16 is a graph illustrating the carrier-to-noise ratio (CNR) of satellites using the indoor antenna.
Figure 17:
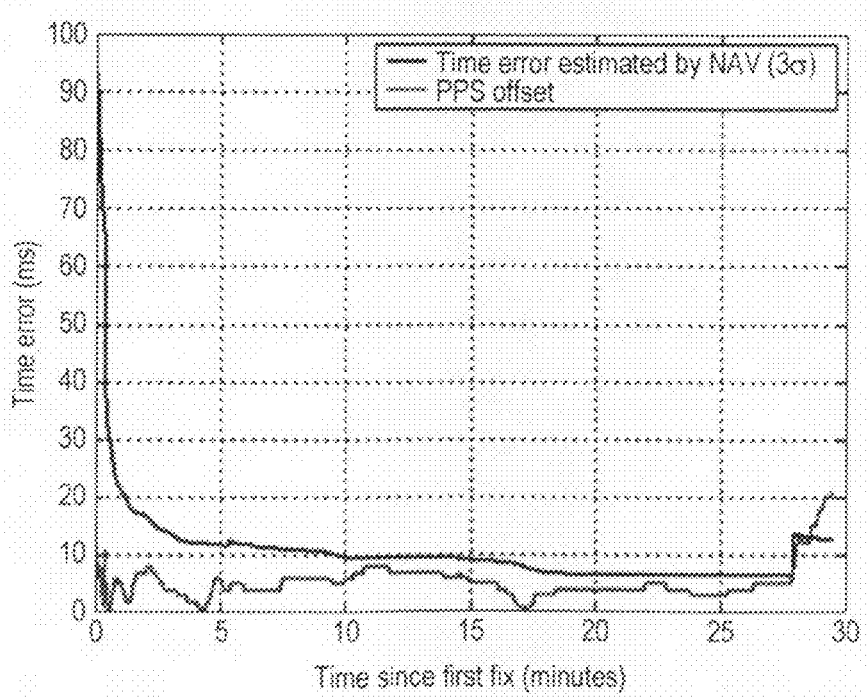
FIGS. 17 and 18 are graphs corresponding to FIGS. 12 and 13 using a different indoor antenna.
Figure 18:
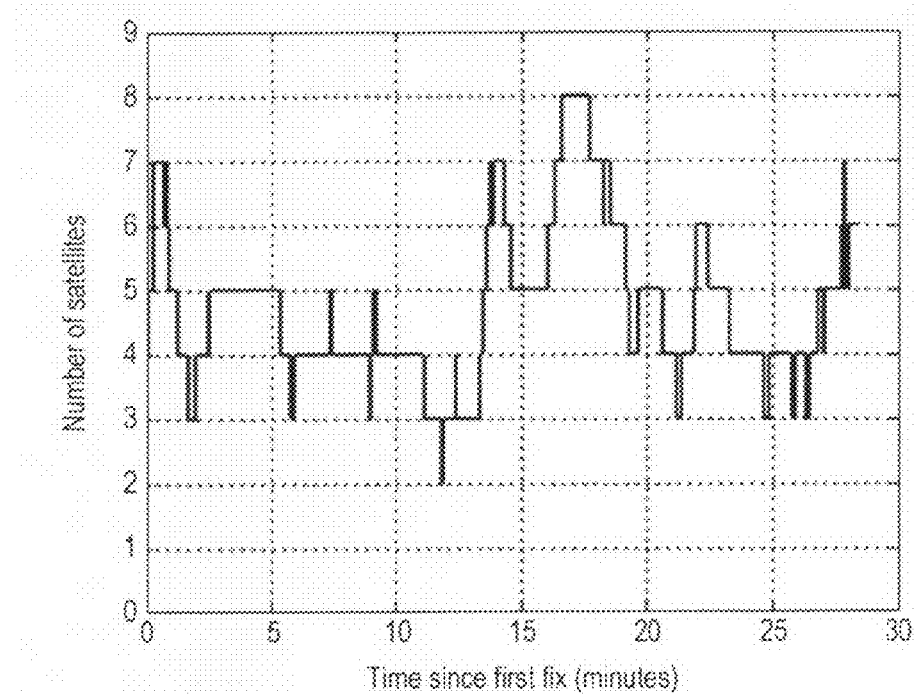
Figure 19:
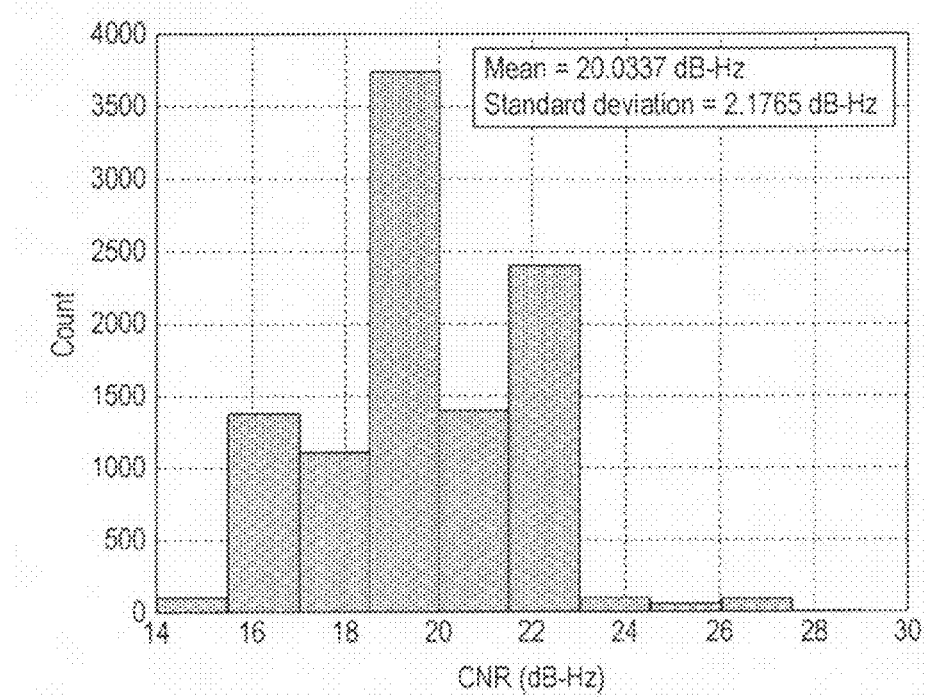
FIG. 19 is a CNR graph obtained using the second indoor antenna.

In order to test the time convergence of the navigation solution, special software was developed whereby the data demodulation function was disabled so that the receiver did not extract timing from the received GPS signal. Assistance data was supplied to the GN4540 test receiver via an A-GPS link. FIGS. 12, 14 and 17 illustrate how time was converged by the navigation solution after the fix had been established.

(1) Using a GPS Signal Simulator

Figure 13:
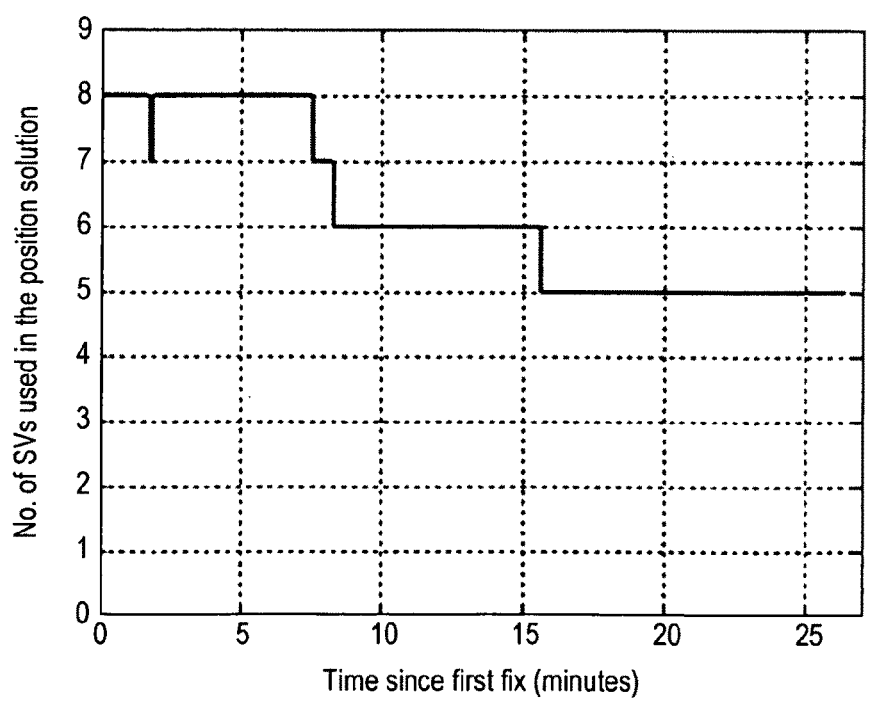
FIG. 13 is a graph illustrating the number of satellites used in the navigation solution from which the time error diagram of FIG. 12 was obtained.

FIGS. 12 and 13 present the results for the simulator test run. The signal level for all the satellites was set to −155 dBm. FIG. 12 illustrates how the time was converged by the navigation solution while FIG. 13 shows the number of satellites used in the position solution after the fix had been established.

(2) Using an Indoor Patch Antenna [1]

FIGS. 14 to 19 show the results for an indoor environment scenario.

(3) Using an Attenuated Outdoor Antenna

Figure 20:
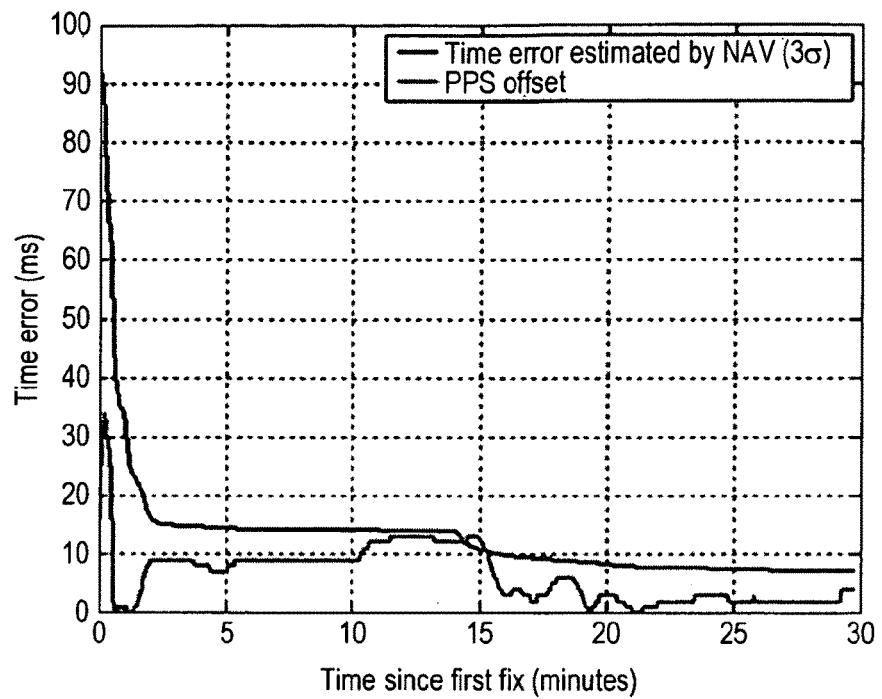
FIGS. 20 and 21 are graphs corresponding to the time error and number of satellite graphs of FIGS. 12 and 13 using, instead, an attenuated roof antenna.
Figure 21:
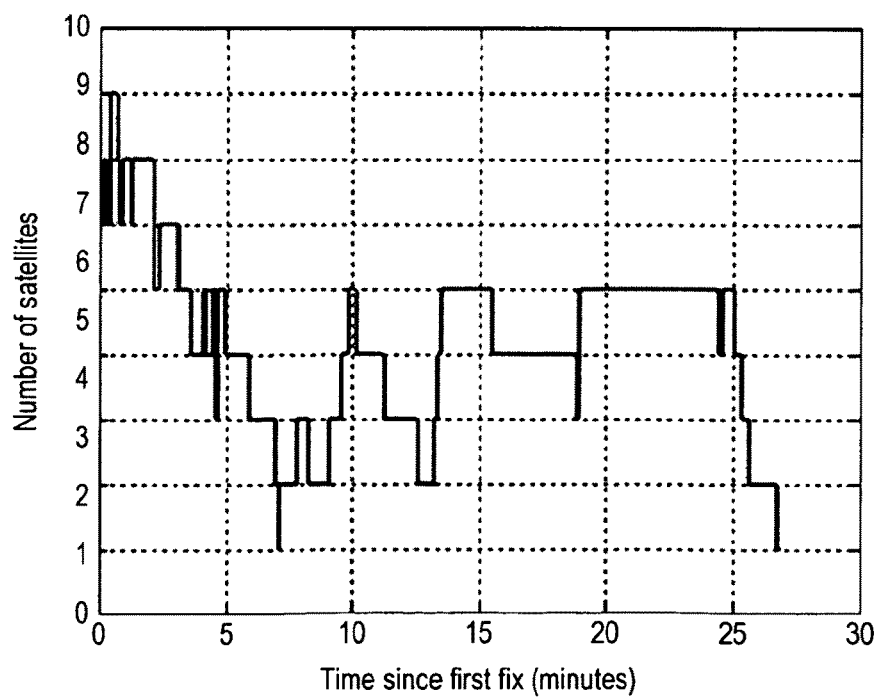

FIGS. 20 and 21 show the results using an attenuated outdoor antenna.

The figures show that although the navigation solution converges time for signal from a simulator to less than 10 ms (FIG. 12), it does not converge time to less than 10 ms for real GPS signals in harsh environments (as seen in FIGS. 14, 17 and 20) after getting a fix. The pattern match algorithm is initialized when the time estimate is less than a pre-determined threshold. After the data pattern is found and with the bit sync information, an exact sub-frame sync is declared and the precise time is established.

Results

This section presents some results for the test activities on the GNS4540 receiver platform. Assistance data was supplied via an A-GPS link to the test receiver. A reference station was configured as a base station to monitor the 1 pps output from the test receiver. The time difference (offset) was measured between the 1 pps timing pulse from the reference receiver and the 1 pps timing pulse of the GNS4540 test receiver. This measurement was taken every second over the test period. Each test run lasted 30 minutes.

A series of tests was performed using signals from (1) a GPS simulator and (2) an attenuated roof antenna. Table 1 above summarizes the initial conditions used for these test activities.

(1) Using a GPS Signal Simulator

Figure 22:
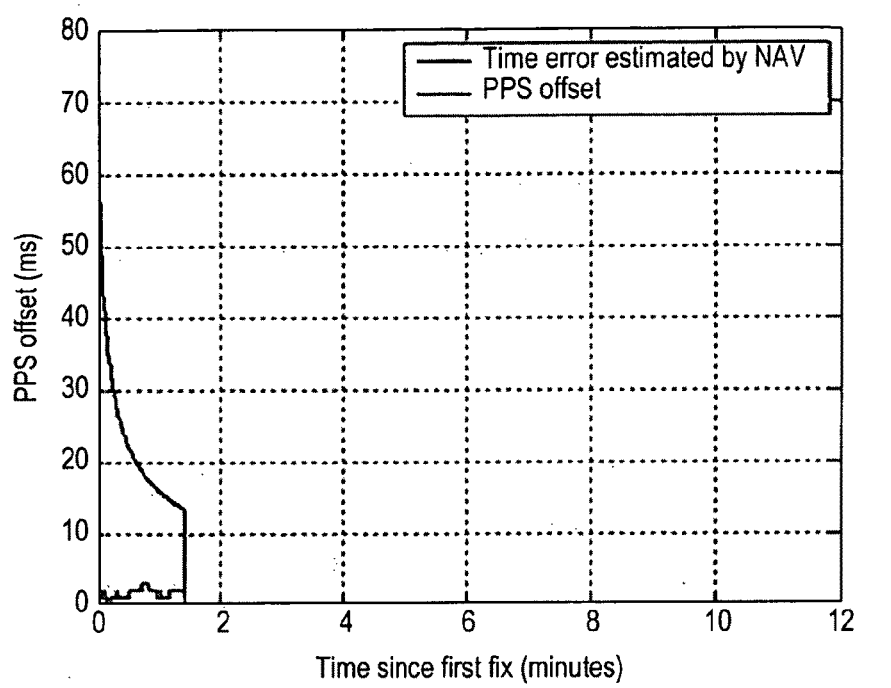
FIGS. 22 and 23 are graphs corresponding to FIGS. 12 and 13, but using low signal acquisition with a GPS signal simulator.
Figure 23:
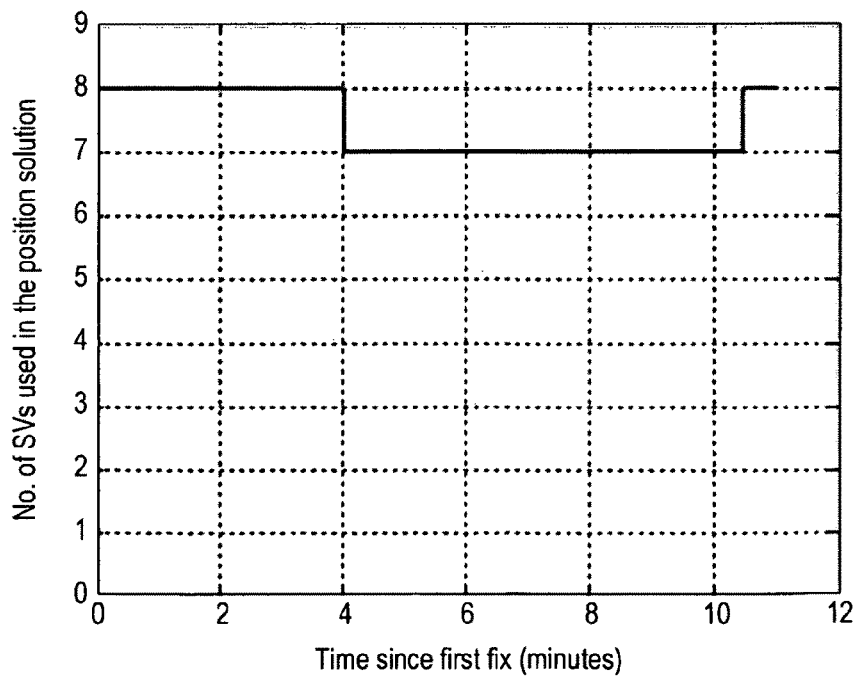

FIGS. 22 and 23 show the results for the simulator test run. The signal level for all the satellites was set to −155 dBm. FIG. 22 illustrates how the time was converged by the navigation solution while FIG. 23 shows the number of satellites used in the position solution after the fix had been established.

(2) Using an Attenuated Roof Antenna

Figure 24:
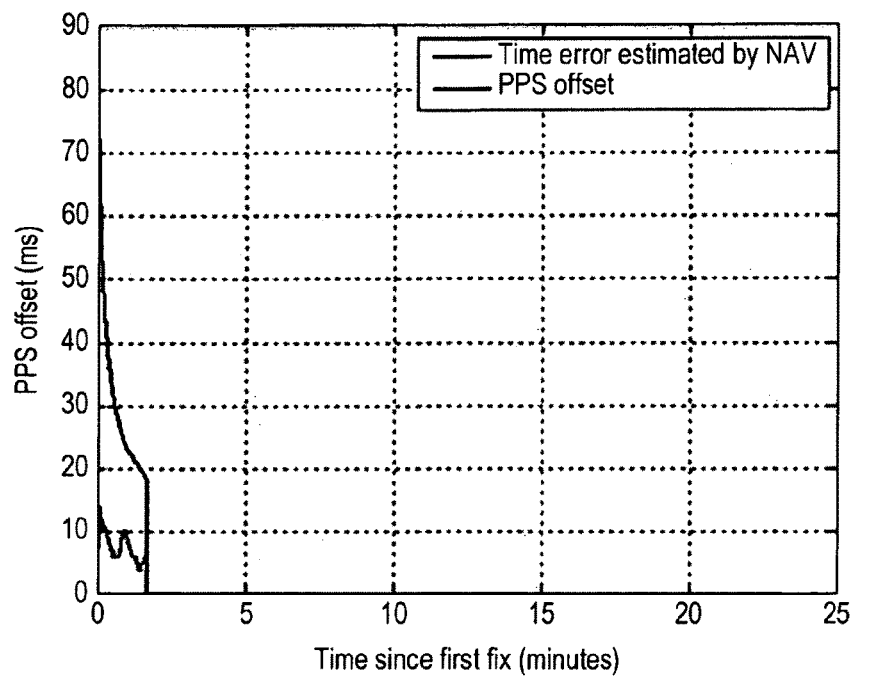
FIGS. 24 and 25 are graphs corresponding to FIGS. 12 and 13, using low signal acquisition from an attenuated roof antenna.
Figure 25:
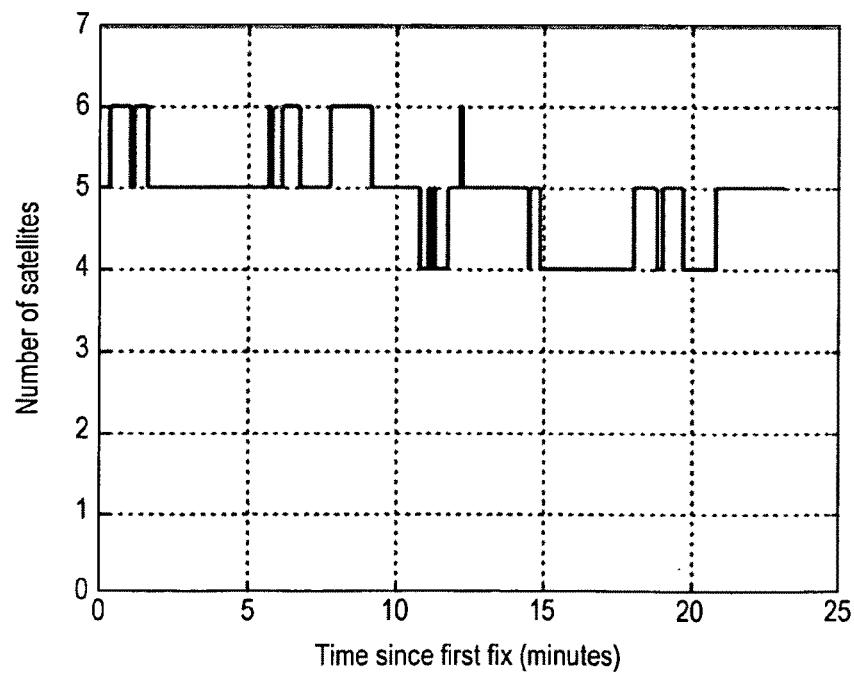
Figure 26:
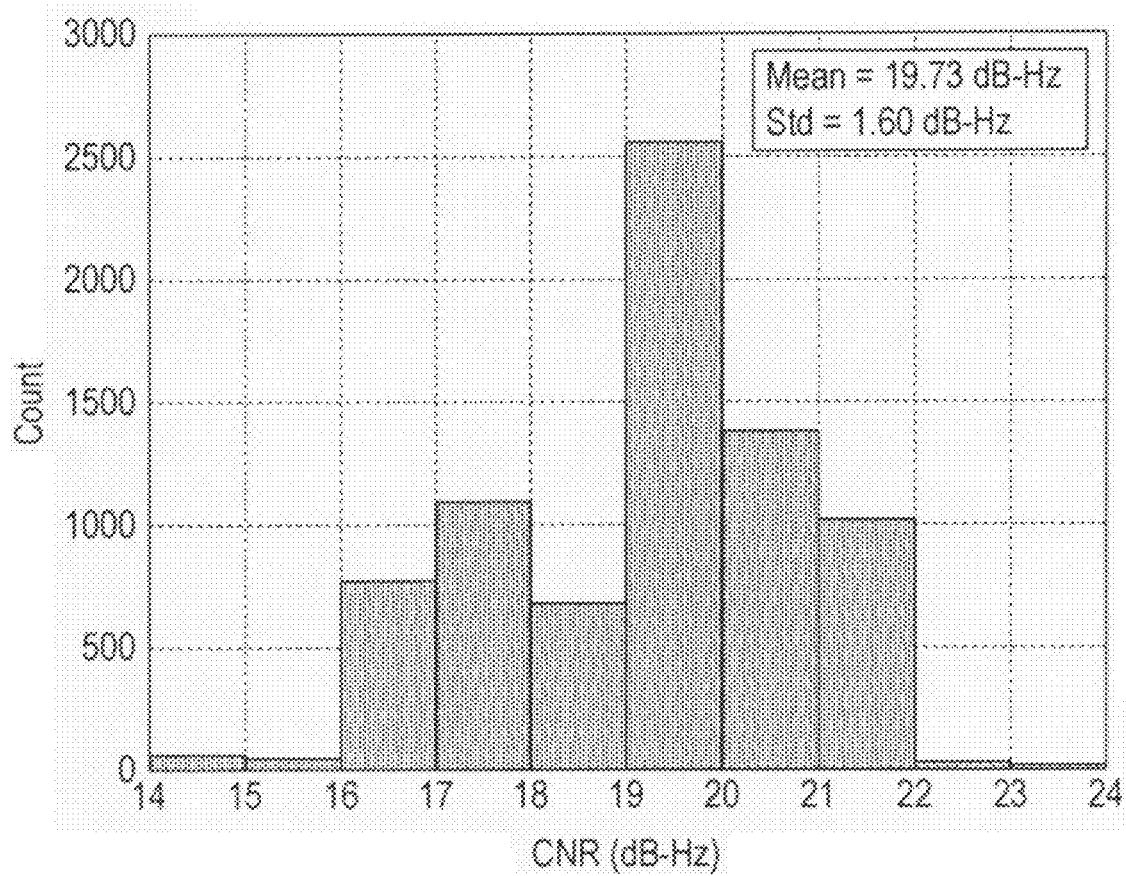
FIG. 26 is a CNR graph of satellites using an attenuated roof antenna.

FIGS. 24 to 26 show the results from an attenuated roof antenna. FIG. 24 shows that precise timing is achieved under weak signal conditions. FIG. 25 shows the number of satellites used by the navigation solution while FIG. 26 shows the signal levels for all satellites during the test run.

The simulator-based tests indicate that the navigation solution may refine time to less than 10 ms. In such a situation, precise time can be determined with the bit synchronisation algorithm alone since the timing ambiguity has been resolved by the navigation solution to approximately ±10 ms. However, with real signals including multipath, cross-correlations, interference, etc., the results show that the navigation solution is not reliable for less than ±10 ms, and thus, the sub-frame synchronisation algorithm is usually necessary.

A series of tests were run at −155 dBm, with an initial horizontal position error of 2,900 km, a vertical position error of 100 m and a time error of 2 seconds, position fixed accurately 90% of the time within 30 minutes (the test is restarted after 30 minutes). The mean Time to First Fix (TTFF) was 6.01 minutes.

Finally, the results showed that using only an additional pattern match algorithm (i.e, not requiring data-aiding) and an improved bit synchronisation algorithm, the 'indoor' solution is capable of establishing precise time down to −155 dBm in real-world conditions.

The above-described tests demonstrate that precise timing can be achieved under extremely weak signal conditions. In particular, the invention makes use of a pattern matching algorithm (that does not necessarily require date-aiding) to establish precise time with incoming signals as weak as −155 dBm. The invention also includes an improved bit synchronisation algorithm, as described above.

In one aspect, the invention may also be summarised as a method of establishing precise time from pseudorange measurement of a GNSS system, whose coding does not provide for direct unambiguous pseudorange measurements. Assistance data is used including ephemeris or almanac (from internal or external sources)

The method performs the steps, in a GNSS receiver, of tracking multiple satellites, and providing a position-velocity-time (PVT) estimate using partial pseudo-range measurements, Doppler measurements, and ambiguity resolution algorithms to best-fit the measurements and assistance data, the time solution providing a time uncertainty bound equivalent to a small number of data-bits Use of high-sensitivity data-bit synchronisation algorithms aided by feedback from the frequency tracking loop permits longer time-constants than would otherwise be acceptable due to Doppler shifts The method includes identification of a series of data sequences, each of a length approximately equal to the inverse of the expected frequency loop stability, and with good autocorrelation properties. It also includes correlation of these known, provided, or predicted, data sequences with incoming signals, synchronised to the data-bits for a small number of alternative delays bounded by the GNSS receiver time solution uncertainty Further correlation, using incoherent methods, may be employed over a number of data sequences to identify the most likely delay.

A time solution is then established to an ultimate accuracy determined by the accuracy of the code tracking by combining the bit-sync and data delay times from at least one satellite with the approximate time of the original PVT solution. (This combination may be carried out in a Kalman filter.)

The invention claimed is:

1. A time reference system for generating a time reference from signals produced by a global navigation satellite constellation, wherein the system comprises:
   a satellite signal receiver having a radio frequency stage configured to receive and down convert code-modulated signals from a plurality of satellites and a correlator configured to receive, track and decode the down-converted satellite signals to provide signals containing partial pseudo-range measurements for respective satellites, and
   a data processing arrangement configured to receive signals containing assistance data from a source other than the received and down-converted satellite signals and the signals containing partial pseudo-range measurements, to perform data-bit synchronisation in which the bit edges of a data bit stream carried by the received satellite signals are identified, to perform correlation of pre-selected data sequences in the data stream to resolve time ambiguities, and to compute a time reference signal based on the assistance data, the partial pseudo-range measurements and code-tracking outputs from the satellite signal receiver, the data-bit synchronisation and the data sequence correlation.

2. The system according to claim 1, including a frequency-locked loop operable to generate a Doppler shift signal indicative of Doppler shifts caused by satellite motion, wherein the data processing arrangement is configured to modify the data-bit synchronisation in response to the Doppler shift signal.

3. The system according to claim 1, wherein the data processing arrangement is configured:
   (i) to provide a preliminary time solution with a time uncertainty equal to the duration of between 1 and 5 data-bits of a low frequency data stream using a position-velocity-time estimate produced from the partial pseudo-range measurements and Doppler measurements and using ambiguity resolution algorithms to provide a best-fit for the said partial pseudo-range measurements and said Doppler measurements and the assistance data, (ii) to perform intermediate ambiguity resolution and time solution adjustment using the results of the data-bit synchronisation and the correlation of pre-selected data sequences from the signals received from a selected one of the satellites from which the receiver receives signals, and (iii) to further adjust the time solution in response to the code-tracking outputs to produce the time reference signal.

4. The system according to claim 1, wherein the pre-selected data sequences embody a repeated data pattern, and the data processing arrangement is configured such that the correlation of the data sequences comprises correlation of successive instances of the repeated data pattern in the data stream in the signal received from at least one of the satellites from which signals are received by the receiver.

5. The system according to claim 1, wherein the pre-selected data sequences are selected on the fly using the assistance data, and/or by prediction based on previously received data sequences, and wherein the data processing arrangement is configured to perform the selection by performing autocorrelation of the data patterns of potential data sequences, the selection being based on the quality of the auto-correlation maximum compared to average or secondary values.

6. The system according to claim 4, wherein the correlation of the data sequences is performed by a combination of coherent integrations and incoherent integrations.

7. The system according to claim 1, wherein the data processing arrangement is configured to provide a preliminary position-velocity-time solution having a time accuracy no better than +/−11 ms, the solution being in the form of a plurality of pseudo-range time-of-transmission solution options at least one of which has a time accuracy of better than +−0.3 ms.

8. The system according to claim 1 further comprising a frequency-locked loop, wherein the data processing arrangement is configured to perform the correlation of the pre-selected data sequences using coherent integration over intervals no longer than a reciprocal of the frequency stability of the frequency-locked loop.

9. The system according to claim 8, wherein the data processing arrangement is configured such that the selection of the at least one option includes incoherently integrating the results of the said coherent integration over a longer interval.

10. The system according to claim 1, wherein said data sequences are pre-selected according to a predetermined correlation property.

11. The system according to claim 1, wherein the pre-selected data sequences are selected by an autocorrelation process.

12. The system according to claim 1, wherein said data sequences are pre-selected according to their performance in discriminating between alignment and misalignment of the data sequences with a reference data sequence or sequences.

13. The system according to claim 12, wherein said data sequences are pre-selected according to their auto-correlation discrimination performance.

14. A method of generating a time reference signal from signals produced by a global navigation satellite constellation, comprising:

(a) receiving, down-converting, and tracking the signals transmitted by a plurality of satellites in the constellation to produce a plurality of receiver output signals, receiving assistance data from a source other than the directly received satellite signals, and producing, from the receiver output signals and the assistance data, signals representing a preliminary time solution, (b) performing data-bit synchronization, using a data processor, in which bit edges of a data stream carried by the signals transmitted by at least one of the satellites are identified, the data-bit synchronisation including performing frequency-shift-compensated integration of samples of the received data stream.

15. A time reference system for generating a time reference signal from signals produced by a global navigation satellite constellation, wherein the system comprises:

a satellite signal receiver having a radio frequency stage for receiving and down-converting code-modulated signals from a plurality of satellites and a correlator to receive, track and decode the down-converted satellite signals to provide signals containing partial pseudo-range measurements for respective satellites, and a data processing arrangement configured to receive signals containing assistance data from a source other than the received and down-converted satellite signals and the signals containing partial pseudo-range measurements, to perform data-bit synchronisation in which bit edges of a data bit stream carried by the received satellite signals are identified, to compute a position-velocity-time solution using time-of-arrival measurements of signals received by the receiver from the satellites, and to perform correlation of the data bit stream in the received and down-converted satellite signals with pre-selected data sequences, and, using all three of the data-bit synchronisation, the position-velocity-time solution, and the data bit stream correlation to compute a time reference signal.

* * * * *